(12) United States Patent
Jeong et al.

(10) Patent No.: US 12,272,816 B2
(45) Date of Patent: Apr. 8, 2025

(54) ACTIVE MATERIAL STRUCTURE, ELECTRODE STRUCTURE INCLUDING THE SAME, SECONDARY BATTERY INCLUDING THE SAME, AND METHOD OF FABRICATING THE SAME

(71) Applicant: SAMSUNG ELECTRONICS CO., LTD., Suwon-si (KR)

(72) Inventors: Huisu Jeong, Seongnam-si (KR); Hwiyeol Park, Hwaseong-si (KR); Kyounghwan Kim, Seoul (KR); Jeongkuk Shon, Hwaseong-si (KR); Junhyeong Lee, Seoul (KR); Sungjin Lim, Suwon-si (KR); Jin S. Heo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 781 days.

(21) Appl. No.: 17/036,170

(22) Filed: Sep. 29, 2020

(65) Prior Publication Data
US 2021/0202934 A1     Jul. 1, 2021

(30) Foreign Application Priority Data

Dec. 30, 2019   (KR) .................. 10-2019-0178164

(51) Int. Cl.
| H01M 4/36 | (2006.01) |
| H01M 4/02 | (2006.01) |
| H01M 4/04 | (2006.01) |

(52) U.S. Cl.
CPC ........... *H01M 4/366* (2013.01); *H01M 4/043* (2013.01); *H01M 4/0471* (2013.01); *H01M 2004/021* (2013.01); *H01M 2004/025* (2013.01)

(58) Field of Classification Search
None
See application file for complete search history.

(56) References Cited

U.S. PATENT DOCUMENTS

| 920,614 | A | * | 5/1909 | Mcberty | |
| 5,294,504 | A | * | 3/1994 | Otagawa | ............... H01M 4/606 |
| | | | | | 428/411.1 |

(Continued)

FOREIGN PATENT DOCUMENTS

| CN | 103972468 A | 8/2014 |
| CN | 105609845 A | 5/2016 |

(Continued)

OTHER PUBLICATIONS

Bates, J. B., Dudney, N. J., Neudecker, B. J., Hart, F. X., Jun, H. P., & Hackney, S. A. (2000). Preferred orientation of polycrystalline LiCoO2 films. Journal of The Electrochemical Society, 147(1), 59. (Year: 2000).*

(Continued)

*Primary Examiner* — Haroon S. Sheikh
(74) *Attorney, Agent, or Firm* — CANTOR COLBURN LLP

(57) ABSTRACT

An active material structure includes first active material lines arranged in a first direction, second active material lines arranged in a second direction intersecting the first direction, and intermediate active material lines between the first active material lines and the second active material lines in a third direction intersecting the first direction and the second direction, the intermediate active material lines provided in overlapping regions of the first active material lines and the second active material lines, wherein the upper active material lines and the second active material lines are electrically connected by the intermediate active material lines.

44 Claims, 32 Drawing Sheets

(56) References Cited

U.S. PATENT DOCUMENTS

| | | | |
|---|---|---|---|
| 6,197,449 B1* | 3/2001 | Hoffmann | H01M 4/70 429/233 |
| 7,553,584 B2* | 6/2009 | Chiang | H01M 4/0426 429/304 |
| 7,846,579 B2* | 12/2010 | Krasnov | H01M 50/503 429/185 |
| 8,192,789 B2 | 6/2012 | Albano et al. | |
| 8,597,722 B2 | 12/2013 | Albano et al. | |
| 8,900,743 B2* | 12/2014 | Kim | H01M 10/0436 429/126 |
| 9,012,084 B2 | 4/2015 | Yada et al. | |
| 9,065,093 B2* | 6/2015 | Chiang | H01M 4/13 |
| 9,673,467 B2 | 6/2017 | Hamano et al. | |
| 9,793,537 B2 | 10/2017 | Cobb et al. | |
| 10,651,505 B2* | 5/2020 | Jeong | H01M 4/131 |
| 10,847,845 B2* | 11/2020 | Kim | C23C 16/40 |
| 2003/0143466 A1* | 7/2003 | Goda | H01M 4/0433 29/2 |
| 2006/0105141 A1 | 5/2006 | Ku et al. | |
| 2007/0259271 A1* | 11/2007 | Nanno | H01M 6/42 429/318 |
| 2008/0081256 A1* | 4/2008 | Madou | H01M 10/0525 205/159 |
| 2010/0003599 A1* | 1/2010 | Nonoshita | H01M 4/661 204/192.15 |
| 2010/0173204 A1 | 7/2010 | Sugiura et al. | |
| 2012/0009471 A1 | 1/2012 | Sugiura et al. | |
| 2012/0077095 A1* | 3/2012 | Roumi | H01M 8/0247 429/405 |
| 2012/0135292 A1 | 5/2012 | Buckingham et al. | |
| 2013/0136973 A1* | 5/2013 | Shenoy | H01M 10/0525 429/211 |
| 2013/0164612 A1* | 6/2013 | Tanemura | H01M 4/134 204/485 |
| 2015/0004453 A1* | 1/2015 | Kwon | H01M 50/46 429/94 |
| 2015/0180001 A1 | 6/2015 | Johnson et al. | |
| 2015/0207171 A1* | 7/2015 | Chang | H01M 10/0568 429/188 |
| 2016/0204464 A1* | 7/2016 | Cho | H01M 10/0459 29/623.5 |
| 2016/0204477 A1 | 7/2016 | Yang et al. | |
| 2016/0211527 A1 | 7/2016 | Swiegers et al. | |
| 2017/0040607 A1 | 2/2017 | Cho et al. | |
| 2017/0047582 A1 | 2/2017 | Park et al. | |
| 2017/0084918 A1* | 3/2017 | Yang | H01M 4/1391 |
| 2017/0104235 A1* | 4/2017 | Cho | H01M 4/661 |
| 2017/0149034 A1* | 5/2017 | Jeong | H01M 4/139 |
| 2017/0162858 A1* | 6/2017 | Cobb | B28B 3/20 |
| 2018/0013119 A1* | 1/2018 | Yang | H01M 4/70 |
| 2018/0019476 A1* | 1/2018 | Qiao | H01M 50/581 |
| 2018/0062212 A1* | 3/2018 | Kim | H01M 4/5825 |
| 2018/0090783 A1* | 3/2018 | Jeong | H01M 4/13 |
| 2018/0114974 A1* | 4/2018 | Park | H01M 10/052 |
| 2018/0131004 A1 | 5/2018 | Yang et al. | |
| 2018/0323421 A1 | 11/2018 | Shen et al. | |
| 2018/0375092 A1* | 12/2018 | Park | H01M 10/0585 |
| 2020/0144608 A1* | 5/2020 | Jeong | H01M 4/043 |
| 2020/0161642 A1* | 5/2020 | Park | H01M 4/0404 |
| 2021/0027954 A1* | 1/2021 | Golodnitsky | H01M 4/625 |
| 2021/0036313 A1* | 2/2021 | Jeong | H01M 4/366 |
| 2022/0166049 A1 | 5/2022 | Kim et al. | |

FOREIGN PATENT DOCUMENTS

| | | |
|---|---|---|
| CN | 107342392 A | 11/2017 |
| JP | 2012099405 A | 5/2012 |
| JP | 5687873 B2 | 1/2015 |
| JP | 6404562 B2 | 10/2018 |
| KR | 200200677 Y1 | 11/2000 |
| KR | 1020180025685 A | 3/2018 |
| KR | 1020190016341 A | 2/2019 |
| KR | 1020200059057 A | 5/2020 |
| KR | 1020210015330 A | 2/2021 |
| WO | 2006064774 A1 | 6/2006 |
| WO | 2019202600 A1 | 10/2019 |

OTHER PUBLICATIONS

Zhang, Q., Zhang, F., Medarametla, S. P., Li, H., Zhou, C., & Lin, D. (2016). 3D printing of graphene aerogels. Small, 12(13), 1702-1708. (Year: 2016).*

European Search Report for European Patent Application No. 20217224.3 dated Jun. 11, 2021.

Office Action issued Feb. 7, 2025 of CN Patent Application No. 202011169352.1.

* cited by examiner

ACTIVE MATERIAL STRUCTURE, ELECTRODE STRUCTURE INCLUDING THE SAME, SECONDARY BATTERY INCLUDING THE SAME, AND METHOD OF FABRICATING THE SAME

CROSS-REFERENCE TO RELATED APPLICATION

This application claims priority to and the benefit of Korean Patent Application No. 10-2019-0178164, filed on Dec. 30, 2019, in the Korean Intellectual Property Office, and all the benefits accruing therefrom under 35 U.S.C. § 119, the content of which in its entirety is herein incorporated by reference.

BACKGROUND

1. Field

The present disclosure relates to an active material structure, an electrode structure, a secondary battery, and a method of fabricating the active material structure.

2. Description of Related Art

A secondary battery is a battery that is chargeable and dischargeable unlike a primary battery that is not rechargeable. A lithium secondary battery may have a high voltage and a high energy density per unit weight compared to a nickel-cadmium battery or a nickel-hydrogen battery.

SUMMARY

Provided are active material structures having improved performance.

Provided are electrode structures having improved performance.

Provided are secondary batteries having improved performance.

Provided are methods of fabricating an active material structure having improved performance.

However, aspects are not limited thereto.

Additional aspects will be set forth in part in the description which follows and, in part, will be apparent from the description, or may be learned by practice of the presented embodiments of the disclosure.

According to an embodiment, an active material structure includes first active material lines arranged in a first direction; second active material lines arranged in a second direction intersecting the first direction; and intermediate active material lines between the first active material lines and the second active material lines in a third direction intersecting to the first direction and the second direction, the intermediate active material lines provided in overlapping regions of the first active material lines and the second active material lines, wherein the first active material lines and the second active material lines are electrically connected by the intermediate active material lines.

A length of an intermediate active material line measured in the first direction may be equal to a width of the intermediate active material line measured in the second direction.

The intermediate active material lines may include a first pair of intermediate active material lines adjacent to each other in the first direction, and a second pair of intermediate active material lines adjacent to each other in the second direction; and a distance in the first direction between the first pair of intermediate active material lines may be equal to a distance in the second direction between the second pair of intermediate active material lines.

The intermediate active material lines may extend in the third direction.

The first active material lines may extend in the second direction, and the second active material lines may extend in the first direction.

A second active material line may have a length measured in the third direction, and an intermediate active material line may have a width measured in the third direction, wherein the width of the intermediate active material line may be greater than the length of the second active material line.

A first active material line may have a thickness measured in the third direction, wherein the width of the intermediate active material line may be greater than the thickness of the first active material line.

The length of the second active material line may be equal to the thickness of the first active material line.

The second active material lines may have a first sintered density, the intermediate active material lines may have a second sintered density, and the first active material lines may have a third sintered density, wherein the first sintered density, the second sintered density, and the third sintered density may be equal.

The second active material lines may have a first sintered density, the intermediate active material lines may have a second sintered density, and the first active material lines may have a third sintered density, wherein the second sintered density may be greater than the first sintered density and the third sintered density.

The first sintered density and the third sintered density may be equal.

The second active material lines may have a first sintered density, the intermediate active material lines may have a second sintered density, and the first active material lines may have a third sintered density, wherein the first sintered density may be less than the second sintered density and the third sintered density.

The second sintered density and the third sintered density may be equal.

The second active material lines may include a first active material, the intermediate active material lines may include a second active material, and the first active material lines may include a third active material, wherein the first active material, the second active material, and the third active material may be the same.

The second active material lines may include a first active material, the intermediate active material lines may include a second active material, and the first active material lines may include a third active material, wherein at least two of the first active material, the second active material, and the third active material may be different.

A side surface of an intermediate active material line may include at least one of a (101) plane or an {hk0} plane, wherein h and k may each represent an integer greater than or equal to 1 and may be the same.

A side surface of a second active material line may include at least one of a (101) plane or an {hk0} plane.

A side surface of a first active material line may include at least one of a (101) plane or an {hk0} plane.

The first active material lines may include first surfaces and second surfaces opposite one another, the second active material lines may include third surfaces and fourth surfaces opposite one another, the first surfaces may be between the second surfaces and the fourth surfaces, the second surfaces may be between the first surfaces and the third surfaces, and the first surfaces, second surfaces, third surfaces, and fourth surfaces may include a (003) plane, wherein, when analyzed by X-ray diffraction using CuKα radiation, an intensity of a peak corresponding to a (003) plane, an intensity of a peak corresponding to a (101) plane, and an intensity of a peak corresponding to a {hk0} plane may satisfy the relationship:

$$(B+C)/A \geq 2.7,$$

wherein A represents the intensity of the peak corresponding to the (003) plane, B represents the intensity of the peak corresponding to the (101) plane, and C represents the intensity of the peak corresponding to the {hk0} plane.

According to an embodiment, an active material structure includes a first active material layer on a second active material layer; an intermediate active material layer between the second active material layer and the first active material layer; first channels extending in the first active material layer and the intermediate active material layer in a first direction; and second channels extending in the second active material layer and the intermediate active material layer in a second direction intersecting the first direction, wherein the first channels and the second channels intersect each other in the intermediate active material layer.

The first active material layer may include a first surface and a second surface opposite one another, the second active material layer may include a third surface and a fourth surface opposite one another, the third surface may be between the second surface and the fourth surface, the second surface may be between the first surface and the third surface, the first channels may extend from a first surface of the first active material layer to a first surface of the second active material layer, thus exposing the first surface of the second active material layer, and the second channels may extend from a second surface of the second active material layer to a second surface of the first active material layer, thus exposing the second surface of the first active material layer.

The first channels may extend into the second active material layer, and the active material structure may include a step between the first surface of the second active material layer exposed via the first channels and a surface of the second active material layer adjacent to the first active material layer.

The second channels may extend into the first active material layer, and the active material structure may include a step between the second surface of the first active material layer exposed via the second channels and a surface of the first active material layer adjacent to the first active material layer.

The active material structure may further include third channels extending in the first active material layer and the intermediate active material layer, the third channels extending in a third direction intersecting the first direction and the second direction, wherein the third channels intersect the first channels and the second channels in the intermediate active material layer.

The first channels and the third channels may intersect each other in the first active material layer.

According to an embodiment, an electrode structure includes a current collector layer; and an active material structure on the current collector layer, wherein the active material structure comprises a first portion and a second portion, the second portion of the active material structure is between the first portion of the active material structure and the current collector layer, the second portion of the active material structure comprises a first surface and a second surface opposite one another, the first surface is between the first portion of the active material structure and the second surface, the current collector layer comprises a third surface and a fourth surface opposite one another, the third surface is between the active material structure and the fourth surface, the active material structure includes first channels extending in a first direction parallel to the first surface of the current collector layer; and second channels intersecting the first channels and extending in a second direction parallel to the first surface of the current collector layer, the first surface of the current collector layer is exposed via the first channels, and the first surface of the second portion of the active material structure is exposed via the second channels.

The second portion of the active material structure may include second active material lines extending in the first direction, wherein the first channels may be provided between the second active material lines.

The first portion of the active material structure may include a first surface and a second surface opposite one another, the second surface of the first portion of the active material structure may be between the first surface of the first portion of the active material structure and the second portion of the active material structure, the second channels may pass through the first portion of the active material structure, and the second surface of the first portion of the active material structure may be exposed via the first channels.

The first portion of the active material structure may include first active material lines extending in the second direction, wherein the second channels are provided between the first active material lines.

A depth of a first channel measured in a third direction may be about 50% to about 80% of a thickness of the active material structure measured in the third direction, the third direction being perpendicular to the first surface of the current collector layer, a depth of a second channel measured in the third direction may be about 50% to about 80% of the thickness of the active material structure, wherein the thickness of the active material structure may be in a range of about 50 micrometers (μm) to about 1,000 μm.

A width of a first channel measured in the second direction may be in a range of about 0.5 μm to about 10 μm, a width of a second channel measured in the first direction may be in a range of about 0.5 μm to about 10 μm, a distance between a pair of first channels adjacent to each other may be in a range of about 1 μm to about 500 μm, and a distance between a pair of second channels adjacent to each other may be in a range of about 1 μm to about 500 μm.

The electrode structure may further include third channels intersecting the first channels and the second channels and extending in a third direction parallel to the first surface of the current collector layer, wherein the first surface of the second portion of the active material structure may be exposed via the third channels.

The first channels and the second channels may intersect each other between the second portion of the active material structure and the first portion of the active material structure.

According to an embodiment, a secondary battery includes a first electrode structure on a second electrode structure; and a separator between the second electrode structure and the first electrode structure, wherein the second electrode structure includes first active material lines arranged in a first direction; second active material lines arranged in a second direction intersecting the first direction; and intermediate active material lines provided between the first active material lines and the second active material lines in a third direction intersecting the first direction and the second direction, the intermediate active material lines provided in overlapping regions of the first active material lines and the second active material lines, wherein the first active material lines and the second active material lines are electrically connected by the intermediate active material lines.

The second electrode structure may further include a current collector layer provided at opposite sides of the intermediate active material lines with the second active material lines interposed therebetween.

The second battery may further include first channels between the first active material lines; and second channels between the second active material lines, wherein the first active material lines may include first surfaces and second surfaces opposite one another, the second active material lines may include third surfaces and fourth surfaces opposite one another, the third surfaces may be between the second surfaces and the fourth surfaces, the second surfaces may be between the first surfaces and the third surfaces, the first channels extend between the intermediate active material lines, thus exposing the third surfaces, the second channels extend between the intermediate active material lines, thus exposing the second surfaces, and the first channels and the second channels intersect each other between the intermediate active material lines.

The second battery may further include an electrolyte in the first channels and the second channels.

According to an embodiment, a method of fabricating an active material structure includes providing an active material film; forming first channels in the active material film, the first channels arranged in a first direction; forming second channels in the active material film, the second channels arranged in a second direction intersecting the first direction; and sintering the active material film, wherein the first channels are recessed regions of the active material film that are recessed to a first depth from a first surface of the active material film, the second channels are recessed regions of the active material film that are recessed to a second depth from a second surface of the active material film, the second surface of the active material film being opposite the first surface of the active material film, and a sum of the first depth and the second depth is greater than a thickness of the active material film measured in a third direction, the third direction intersecting the first direction and the second direction.

The forming of the first channels may include pressing the first surface of the active material film with a first stamp such that the first stamp is inserted into the active material film, and the forming of the second channels may include pressing the second surface of the active material film with a second stamp such that the second stamp is inserted into the active material film.

The providing of the active material film may include forming a preliminary second active material layer; forming a preliminary intermediate active material layer on the preliminary second active material layer; and forming a preliminary first active material layer on the preliminary intermediate active material layer.

The first depth may be equal to a sum of a thickness of the preliminary intermediate active material layer measured in the third direction and a thickness of the preliminary first active material layer measured in the third direction, and the second depth may be equal to a sum of the thickness of the preliminary intermediate active material layer and a thickness of the preliminary second active material layer measured in the third direction.

The first depth may be greater than a sum of a thickness of the preliminary intermediate active material layer measured in the third direction and a thickness of the preliminary first active material layer measured in the third direction, and the second depth may be greater than a sum of the thickness of the preliminary intermediate active material layer and a thickness of the preliminary second active material layer measured in the third direction.

A binder may be provided in the active material film before the sintering of the active material film, and removed from the active material film during the sintering of the active material film.

The method may further include forming third channels in the active material film, the third channels arranged in a third direction intersecting the first direction and the second direction, wherein the third channels may be recessed regions of the active material film that are recessed to a third depth from the first surface of the active material film.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
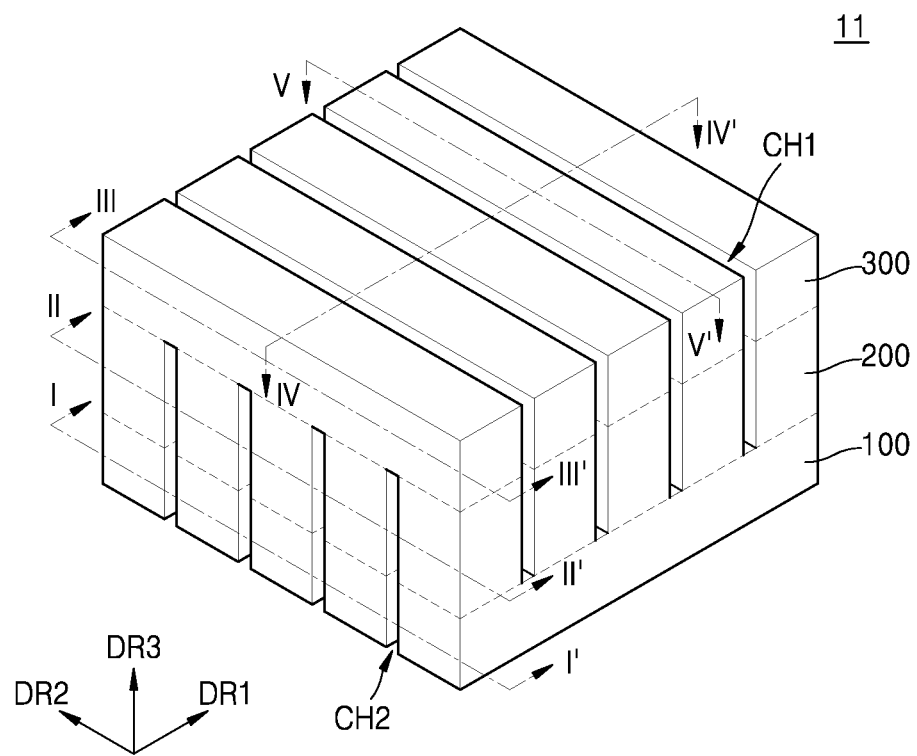
FIG. 1 is a perspective view of an embodiment of an active material structure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. In the drawings, the same reference numerals represent the same elements, and a size of each element may be exaggerated for clarity and convenience of description. Embodiments described below are merely examples and various modifications may be made therein.

As used herein, the term "on" or "above" an element may be understood to mean that the element can be directly on another element or be on another element not in contact with the other element.

As used herein, the singular expressions are intended to include plural forms as well, unless the context clearly dictates otherwise. It will be understood that when an element is referred to as "including" another element, the element may further include other elements unless mentioned otherwise.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. For example, "an element" has the same meaning as "at least one element," unless the context clearly indicates otherwise. "At least one" is not to be construed as limiting "a" or "an." "Or" means "and/or."

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the phrase "equal to" or the term "same," when used to compare values, refers to values within 5% of one another, 4% of one another, 3% of one another, 2% of one another, 1% of one another, or exactly equal to one another.

As used herein, the term "perpendicular" refers to an angle of intersection between lines or surfaces in a range of 85° to 95°, in a range of 86° to 94°, in a range of 87° to 93°, in a range of 88° to 92°, in a range of 89° to 91°, or of 90°.

As used herein, surfaces with a "step" therebetween refers to surfaces that do not lie in a common plane.

A high-capacity secondary battery may include an electrode having a three-dimensional structure.

Figure 2A:
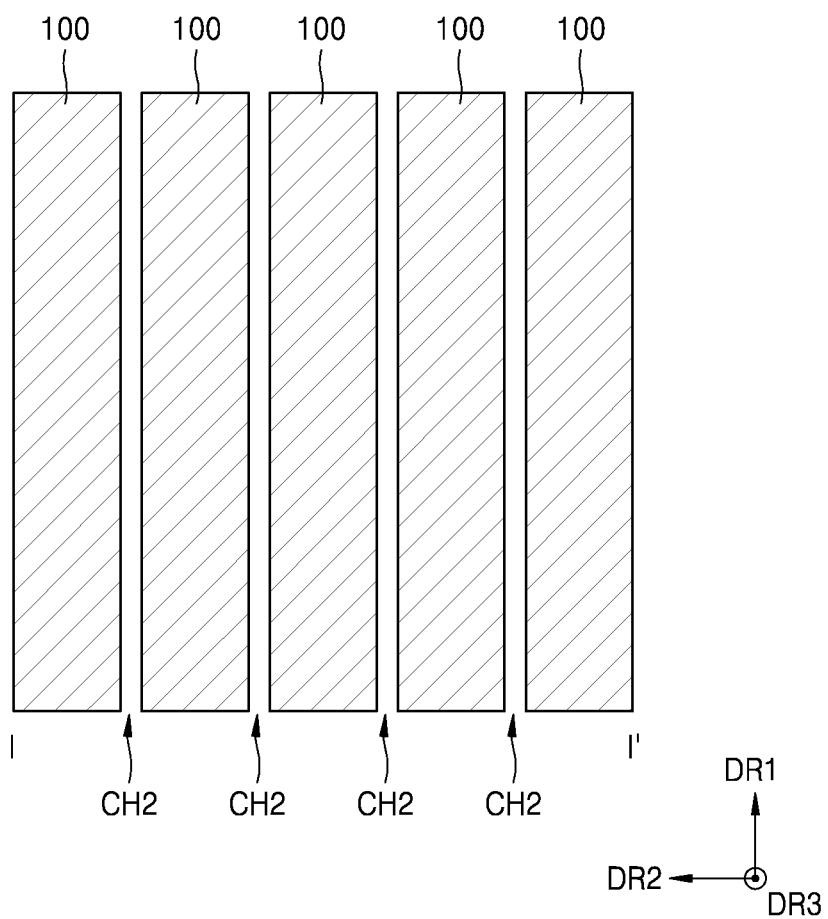
FIG. 2A is a cross-sectional view taken along line I-I' of FIG. 1.
Figure 2B:
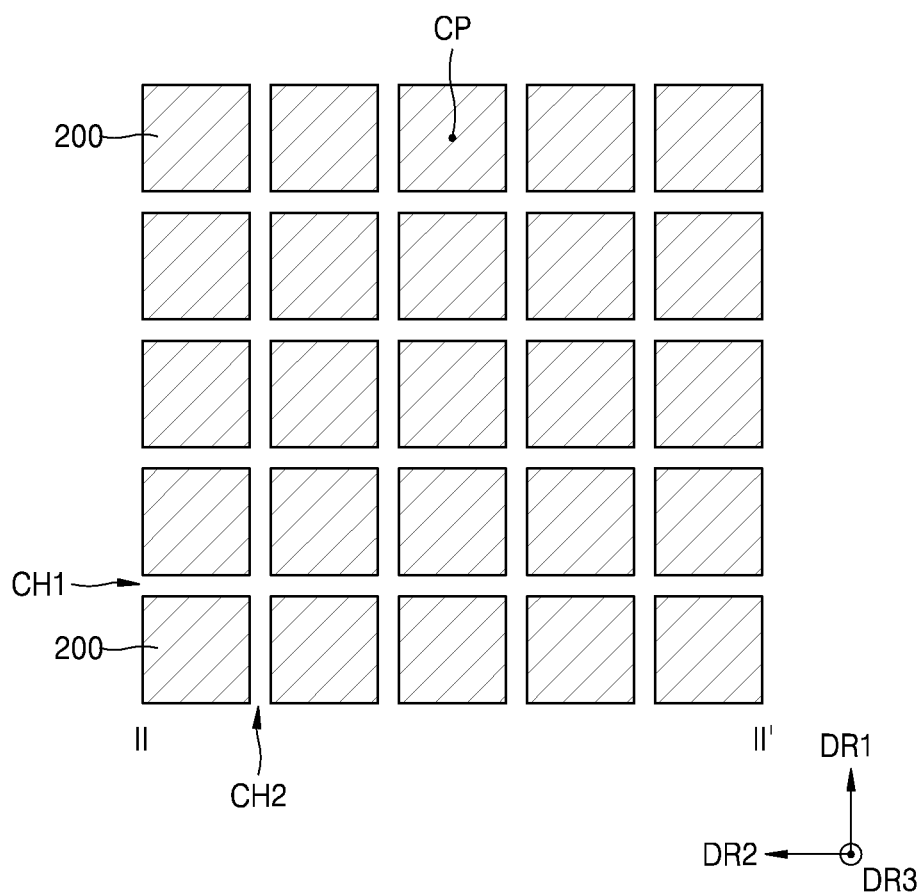
FIG. 2B is a cross-sectional view taken along line II-II' of FIG. 1.
Figure 2C:
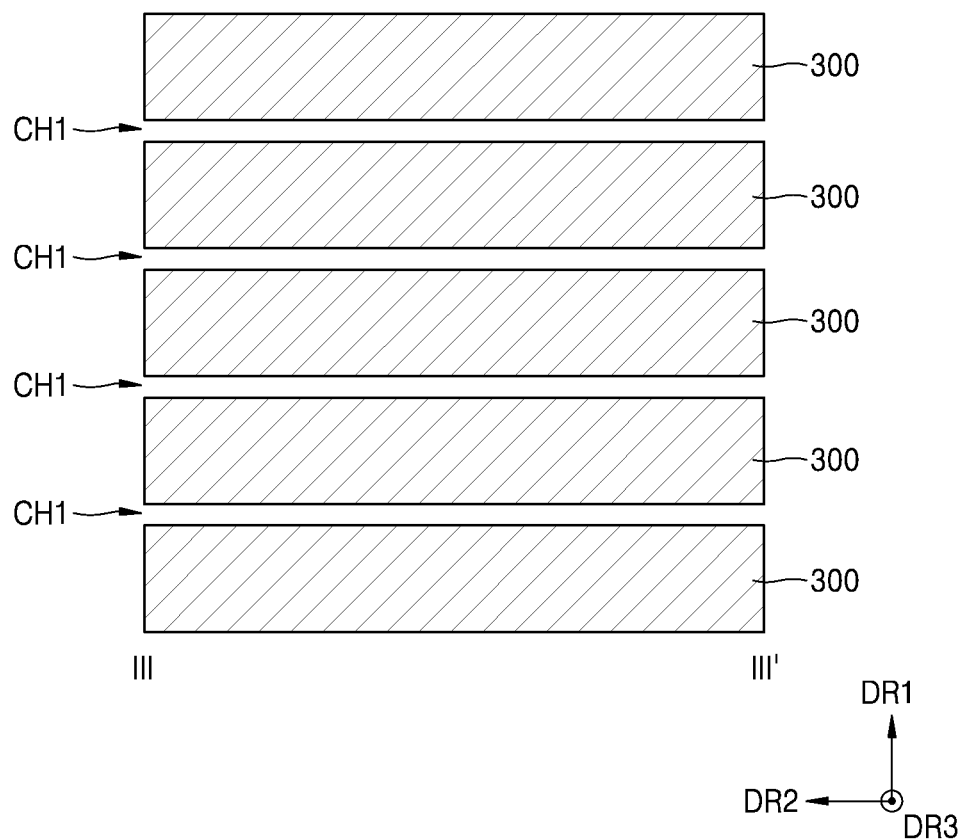
FIG. 2C is a cross-sectional view taken along line III-III' of FIG. 1.
Figure 2D:
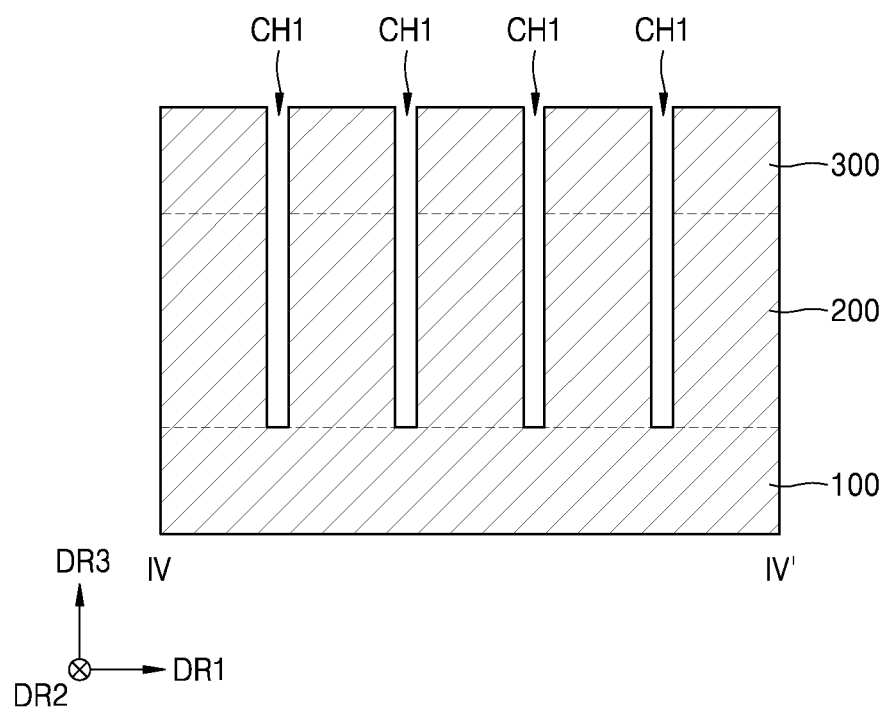
FIG. 2D is a cross-sectional view taken along line IV-IV' of FIG. 1.
Figure 2E:
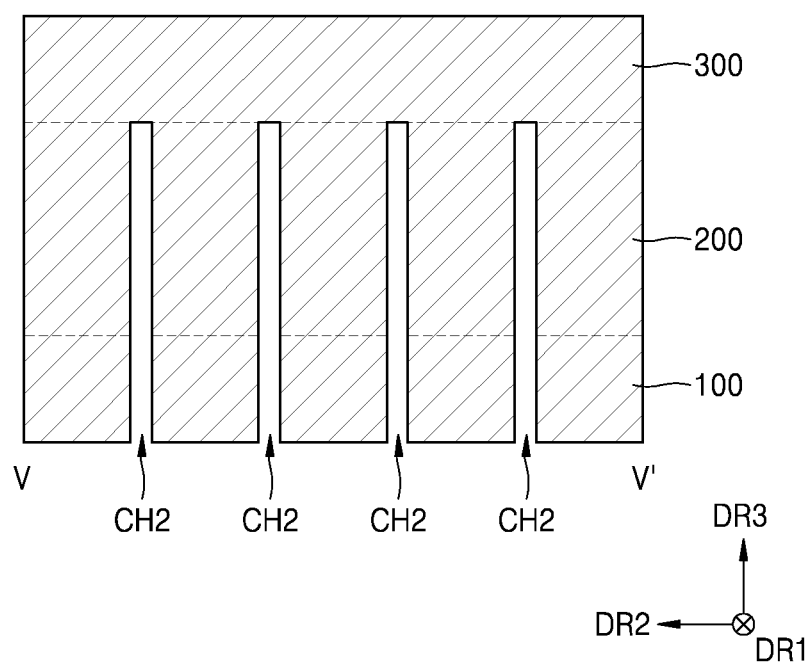
FIG. 2E is a cross-sectional view taken along line V-V' of FIG. 1.

FIG. 1 is a perspective view of an active material structure according to an embodiment. FIG. 2A is a cross-sectional view taken along line I-I' of FIG. 1. FIG. 2B is a cross-sectional view taken along line II-II' of FIG. 1. FIG. 2C is a cross-sectional view taken along line III-III' of FIG. 1. FIG. 2D is a cross-sectional view taken along line IV-IV' of FIG. 1. FIG. 2E is a cross-sectional view taken along line V-V' of FIG. 1.

Referring to FIG. 1, FIG. 2A, FIG. 2B, FIG. 2C, FIG. 2D, and FIG. 2E, an active material structure 11 may be provided. The active material structure 11 may be a cathode active material structure included in a cathode of a secondary battery. The active material structure 11 may include lower, e.g. second, active material lines 100, intermediate active material lines 200, and upper, e.g., first, active material lines 300.

The lower active material lines 100 may extend in a first direction DR1. The lower active material lines 100 may be arranged in a second direction DR2 crossing, e.g., intersecting, the first direction DR1. For example, the lower active material lines 100 may be spaced apart from each other the same distance in the second direction DR2. For example, sizes, e.g., widths, of the lower active material lines 100 in the second direction DR2 may be substantially the same. As used herein, unless indicated otherwise, a "width" of a feature, e.g., a line or layer, refers to a measurement of the feature in a second direction, e.g., DR2.

The lower active material lines 100 may include a cathode active material. For example, the lower active material lines 100 may include LiCoO$_2$ ("LCO"), Li(Ni$_a$Co$_b$Mn$_{1-a-b}$)O$_2$, wherein 0≤a≤1, 0≤b≤1, and a+b=1 ("NCM"), Li(Ni$_x$Co$_y$Al$_{1-x-y}$)O$_2$, wherein 0≤x≤1, 0≤y≤1, and x+y=1 ("NCA"), LiMn$_2$O$_4$ ("LMO"), or LiFePO$_4$ ("LFP"). The lower active material lines 100 may have a first sintered density.

The upper active material lines 300 may extend in the second direction DR2. The upper active material lines 300 may be arranged in the first direction DR1. For example, the upper active material lines 300 may be spaced apart from each other the same distance in the first direction DR1. For example, sizes, e.g., lengths, of the upper active material lines 300 in the first direction DR1 may be substantially the same. As used herein, unless indicated otherwise, a "length" of a feature, e.g., a line or layer, refers to a measurement of the feature in a first direction, e.g., DR1.

The upper active material lines 300 may include a cathode active material. The upper active material lines 300 may include substantially the same material as the lower active material lines 100. For example, the upper active material lines 300 may include LCO, NCM, NCA, LMO, or LFP. The upper active material lines 300 may have a second sintered density that is substantially the same as the first sintered density.

The intermediate active material lines 200 may be provided between the lower active material lines 100 and the upper active material lines 300. The intermediate active material lines 200 may be between the upper active material lines 300 and the lower active material lines 100 in a third direction DR3 intersecting, e.g., perpendicular to, the first direction DR1 and the second direction DR2. The intermediate active material lines 200 may be provided on regions of the upper active material lines 300 and the lower active material lines 100, which overlap with each other in a third direction DR3 intersecting, e.g., perpendicular to, the first direction DR1 and the second direction DR2. The intermediate active material lines 200 may connect, e.g., electrically connect, the lower active material lines 100 to the upper active material lines 300. The upper active material lines 300 may be directly on the intermediate active material lines 200, the intermediate active material lines 200 may be directly on the lower active material lines 100, or the upper active material lines 300 may be directly on the intermediate active material lines 200 and the intermediate active material lines 200 may be directly on the lower active material lines 100. The intermediate active material lines 200 may extend in the third direction DR3. Sizes, e.g., thicknesses, of the intermediate active material lines 200 in the third direction DR3 may be greater than those of the lower active material lines 100 in the third direction DR3 and those of the upper active material lines 300 in the third direction DR3. The sizes, e.g., thicknesses, of the lower active material lines 100 in the third direction DR3 may be the same as the sizes, e.g., thicknesses, of the upper active material lines 300 in the third direction DR3. As used herein, unless indicated otherwise, a "thickness" of a feature, e.g., a line or layer, refers to a measurement of the feature in a third direction, e.g., DR3.

The intermediate active material lines 200 may be arranged in the first direction DR1 and the second direction DR2. For example, the intermediate active material lines 200 may be spaced apart from each other the same distance in the first direction DR1 and the second direction DR2. For example, the sizes, e.g., lengths, of the intermediate active material lines 200 in the first direction DR1 and the second direction DR2 may be substantially the same.

The intermediate active material lines 200 may include a cathode active material. The intermediate active material lines 200 may include substantially the same material as the lower active material lines 100 and the upper active material lines 300. For example, the intermediate active material lines 200 may include LCO, NCM, NCA, LMO, or LFP. The intermediate active material lines 200 may have a second sintered density that is substantially the same as the first sintered density and the third sintered density.

The lower active material lines 100, the intermediate active material lines 200, and the upper active material lines 300 may be in a single-layer structure. For example, the lower active material lines 100 and the intermediate active material lines 200 may be connected, e.g., electrically connected, to each other without an interface therebetween. The intermediate active material lines 200 may be directly on the lower active material lines 100. For example, the upper active material lines 300 and the intermediate active material lines 200 may be connected, e.g., electrically connected, to each other without an interface therebetween. The upper active material lines 300 may be directly on the intermediate active material lines 200.

First channels CH1 may be provided between the upper active material lines 300 and between the intermediate active material lines 200 arranged in the first direction DR1. The first channels CH1 may refer to regions between the upper active material lines 300 arranged in the first direction DR1 and regions between the intermediate active material lines 200 arranged in the first direction DR1. The first channels CH1 may extend from upper surfaces of the upper active material lines 300 to upper surfaces of the lower active material lines 100. Side surfaces of the upper active material lines 300, side surfaces of the intermediate active material lines 200, and the upper surfaces of the lower active material lines 100 may be exposed via the first channels CH1. The side surfaces of the intermediate active material lines 200 exposed via the first channels CH1 may cross the first direction DR1. The first channels CH1 may extend in the second direction DR2.

Second channels CH2 may be provided between the lower active material lines 100 and between the intermediate active material lines 200 arranged in the second direction DR2. The second channels CH2 may refer to regions between the lower active material lines 100 arranged in the second direction DR2 and regions between the intermediate active material lines 200 arranged in the second direction DR2. The second channels CH2 may extend from bottom, e.g., second, surfaces of the lower active material lines 100 to bottom surfaces of the upper active material lines 300. Side surfaces of the lower active material lines 100, the side surfaces of the intermediate active material lines 200, and the bottom surfaces of the upper active material lines 300 may be exposed via the second channels CH2. The side surfaces of the intermediate active material lines 200 exposed via the second channels CH2 may cross the second direction DR2. The second channels CH2 may extend in the first direction DR1.

The first channels CH1 and the second channels CH2 may cross, e.g., intersect, each other between the lower active material lines 100 and the upper active material lines 300. In other words, the first channels CH1 and the second channels CH2 may cross, e.g., intersect, each other between the intermediate active material lines 200.

At least one of the side surfaces of the lower active material lines 100, the side surfaces of the intermediate active material lines 200, or the side surfaces of the upper active material lines 300 which are exposed via the first channels CH1 and the second channels CH2 may include at least one a (101) plane and a {hk0} plane. Here, h and k may be each the same integer greater than or equal to 1. As used herein, the notation {hkl} denotes the set of all planes that are equivalent to (hkl) by symmetry of a lattice.

At least one of the top and bottom surfaces of the upper active material lines 300 or the top and bottom surfaces of the lower active material lines 100 may include a (003) surface.

When the active material structure 11 is analyzed by X-ray diffraction using CuKα radiation, an intensity of a peak corresponding to a (003) plane, an intensity of a peak corresponding to a (101) plane, and an intensity of a peak corresponding to a {hk0} plane may satisfy the relationship:

$$(B+C)/A \geq 2.7,$$

wherein A represents the intensity of the peak corresponding to the (003) plane, B represents the intensity of the peak corresponding to the (101) plane, and C represents the intensity of the peak corresponding to the {hk0} plane.

In an embodiment, numerical values of the active material structure 11 may be as follows. A size, e.g., thickness, of the active material structure 11 in the third direction DR3 may be in a range of about 50 µm to about 1,000 µm for example, about 100 µm to about 900 µm, about 200 µm to about 800 µm, or about 300 µm to about 700 µm. A width of each of the first channel CH1 and the second channel CH2 may be in a range of about 0.5 µm to about 10 µm, for example, about 1 µm to about 9 µm, about 2 µm to about 8 µm, or about 3 µm to about 7 µm. A depth of each of the first channel CH1 and the second channel CH2 may be in a range of about 50% to about 80%, for example, about 55% to about 75%, or about 60% to about 70%, of the size, e.g., thickness, of the active material structure 11 in the third direction DR3. The depths of the first channel CH1 and the second channel CH2 are measured in the third direction DR3. The sum of the distances between central points CP on the intermediate active material lines 200 and two channels adjacent to the central points CP may be referred to as a channel distance. For example, the two channels may be a pair of first channels CH1 immediately adjacent to each other, a pair of second channels CH2 immediately adjacent to each other, or a first channel CH1 and a second channel CH2 immediately adjacent to each other. The channel distance may be in a range of about 1 µm to about 500 µm, for example, about 50 µm to about 450 µm, about 100 µm to about 400 µm, or about 150 µm to about 350 µm. The channel distance may be a size, e.g., depth, of each of the first and second channels CH1 and CH2 in a direction intersecting, e.g., perpendicular to, the direction in which the first and second channels CH1 and CH2 extend. As used herein, unless indicated otherwise, a "depth" of a channel refers to a measurement of the channel in a third direction, e.g., DR3.

In the case of a secondary battery with an active material structure having a sintered density, an active material structure having a high sintered density may be required to increase an energy density of the secondary battery. In order to increase the sintered density, channels having small widths may be required. When an active material structure has only channels extending in one direction, the structural stability of the active material structure may decrease as widths of the channels decrease.

The present disclosure may provide the active material structure 11 with the first channels CH1 and the second channels CH2 that cross, e.g., intersect, each other. The structural stability of the active material structure 11 may be improved owing to the first channels CH1 and the second channels CH2. Accordingly, the first and second channels CH1 and CH2 may have a small width and increase the sintered density of the active material structure 11. Furthermore, the side surfaces of the lower active material lines 100 and the upper active material lines 300 may be exposed via the first and second channels CH1 and CH2, and thus, the lower active material lines 100 and the upper active material 300 are also available. Therefore, the present disclosure may provide the active material structure 11 for providing a secondary battery having a high energy density.

Figure 3:
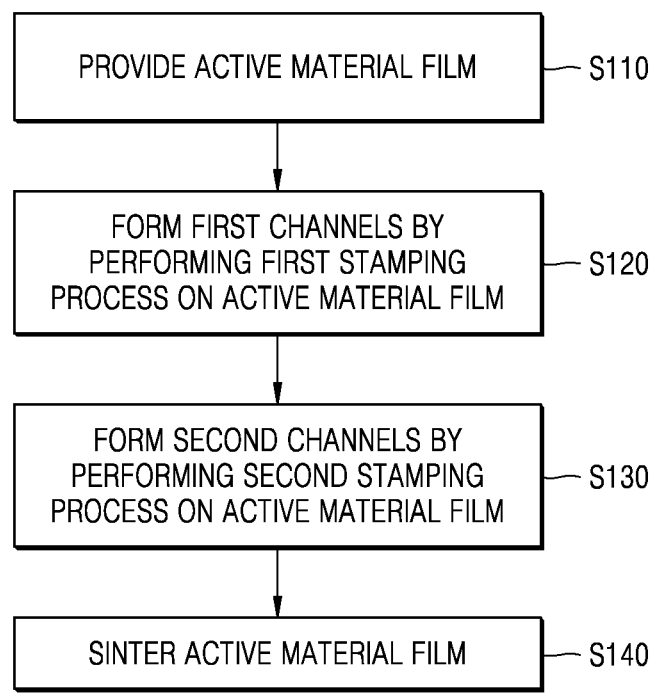
FIG. 3 is a flowchart of a method of fabricating the active material structure described with reference to FIG. 1, FIG. 2A, FIG. 2B, FIG. 2C, FIG. 2D, and FIG. 2E.
Figure 4A:
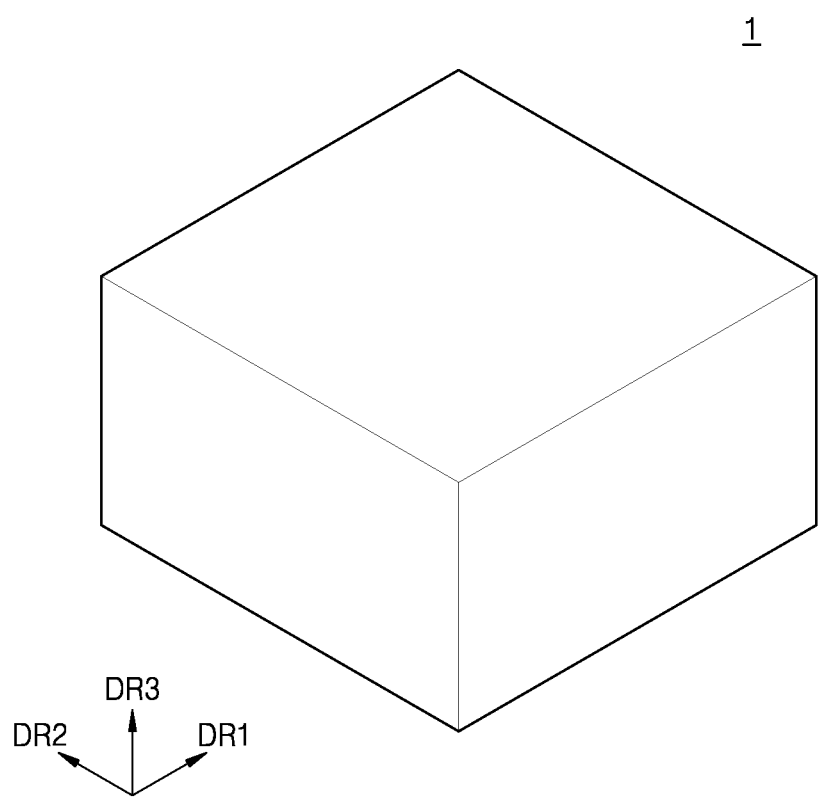
FIG. 4A is a perspective view for explaining the method of fabricating an active material structure of FIG. 3.
Figure 4B:
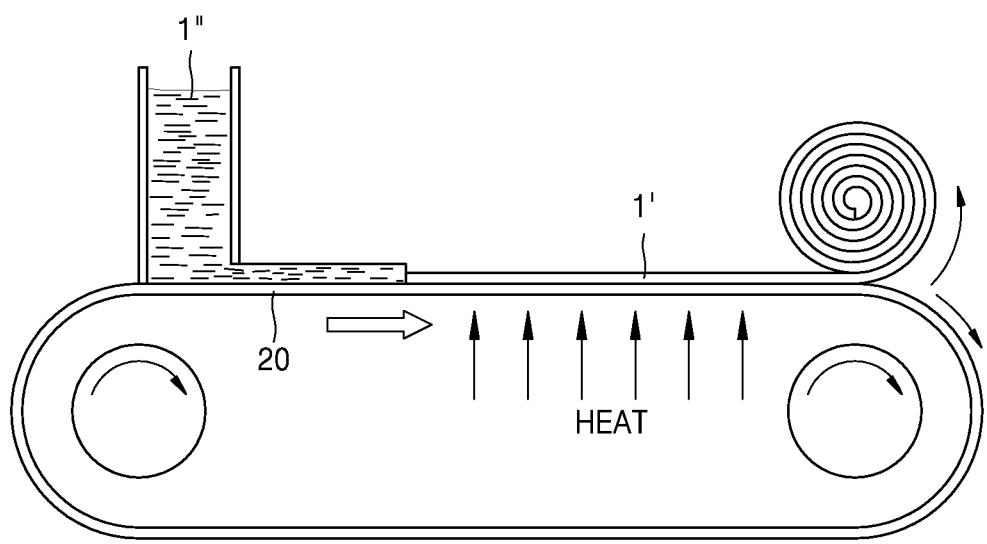
FIG. 4B is a conceptual diagram for explaining the method of fabricating an active material film of FIG. 4A.
Figure 4C:
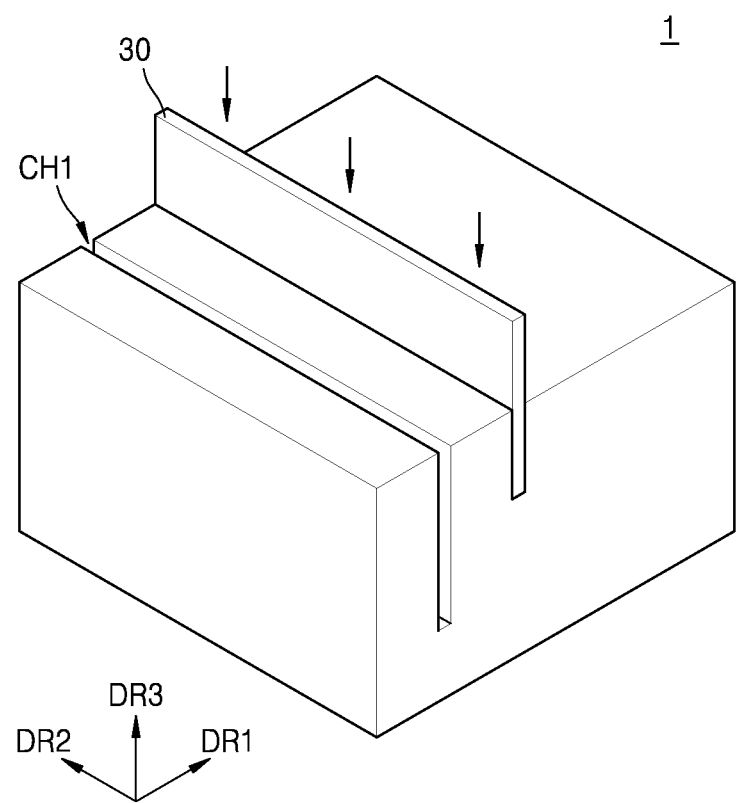
FIG. 4C is a perspective view for explaining the method of fabricating the active material structure of FIG. 3.
Figure 4D:
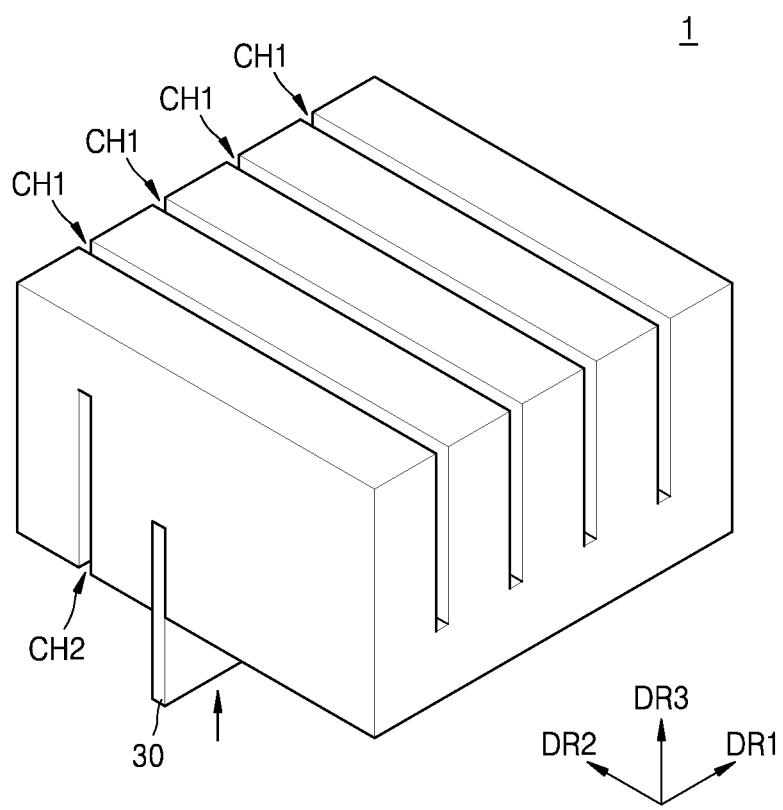
FIG. 4D is a perspective view for explaining the method of fabricating the active material structure of FIG. 3.

FIG. 3 is a flowchart of a method of fabricating the active material structure described with reference to FIG. 1, FIG. 2A, FIG. 2B, FIG. 2C, FIG. 2D, and FIG. 2E. FIG. 4A is a perspective view for explaining the method of fabricating an active material structure of FIG. 3. FIG. 4B is a conceptual diagram for explaining the method of fabricating an active material film of FIG. 4A. FIG. 4C is a perspective view for explaining the method of fabricating the active material structure of FIG. 3. FIG. 4D is a perspective view for explaining the method of fabricating the active material structure of FIG. 3. For brevity of description, a description of parts of FIG. 3, FIG. 4A, FIG. 4B, FIG. 4C, and FIG. 4D that are substantially the same as those described above with reference to FIG. 1, FIG. 2A, FIG. 2B, FIG. 2C, FIG. 2D, and FIG. 2E may be omitted here.

Referring to FIGS. 3 and 4A, an active material film 1 may be provided (S110). The active material film 1 may have a uniform sintered density. The active material film 1 may be formed by a tape casting method. A manufacturing method of the active material film 1 by the tape casting method will be described in detail with reference to FIG. 4B below.

Referring to FIG. 4B, an active material slurry 1" may be prepared. The active material slurry 1" may be formed by mixing active material powder, a dispersing agent, a binder, a plasticizer, a solvent, and the like. The active material powder may contain a cathode active material. For example, the active material powder may contain LCO, NCM, NCA, LMO, or LFP.

The active material slurry 1" may be applied onto a transfer belt 20. For example, the transfer belt 20 may be moved in one direction, and the active material slurry 1" may be provided on the transfer belt 20 that is in motion. The active material slurry 1" may be applied to a uniform thickness onto the transfer belt 20. For example, a thickness of the active material slurry 1" applied on the transfer belt 20 may be uniformly adjusted by a doctor blade (not shown).

The active material slurry 1" applied onto the transfer belt 20 may be dried to form a large-area active material film 1'. For example, the active material slurry 1" may be dried by a heating process. In the large-area active material film 1', the active material powder may be bound together by a binder. The large-area active material film 1' may be cut to form the active material film 1 of FIG. 4A.

Referring to FIGS. 3 and 4C, first channels CH1 (S120) may be formed, for example, by any suitable process, such as by stamping, e.g., a first stamping process may be performed on the active material film 1 to form first channels CH1 (S120). The first stamping process may include pressing an upper surface of the active material film 1 by a blade 30 such that the blade 30 is inserted into the active material film 1. The blade 30 may be inserted into the active material film 1 by being aligned to extend in a second direction DR2. Accordingly, the first channels CH1 may be formed in a shape extending in the second direction DR2. The first channels CH1 may refer to recessed regions of the active material film 1 obtained by the first stamping process.

Referring to FIGS. 3 and 4D, second channels CH2 (S130) may be formed, for example, by any suitable process, such as by stamping, e.g., a second stamping process may be performed on the active material film 1 to form second channels CH2 (S130). The second stamping process may include pressing a bottom surface of the active material film 1 by the blade 30 such that the blade 30 is inserted into the active material film 1. The blade 30 may be inserted into the active material film 1 by being aligned to extend in a first direction DR1. Accordingly, the second channels CH2 may be formed in a shape extending in the first direction DR1. The second channels CH2 may refer to recessed regions of the active material film 1 obtained by the second stamping process.

The sum of a depth of insertion of the blade 30 when the first stamping process is performed and a depth of insertion of the blade 30 when the second stamping process is performed may be greater than a size, e.g., thickness, of the active material film 1 in a third direction DR3. Accordingly, the first channels CH1 and the second channels CH2 may be cross, e.g., intersect, each other.

Referring to FIGS. 3 and 1, the active material film 1 may be sintered to form the active material structure 11 (S140).

If a width of channels is small, the channels may be eliminated, e.g., disappear, when the active material film is sintered (S140). The active material film 1 of an embodiment may include the first channels CH1 and the second channels CH2 that cross, e.g., intersect, each other during sintering. The first channels CH1 and the second channels CH2 may increase the structural stability of the active material film 1. Accordingly, even when the first channels CH1 and the second channels CH2 have a small width, the first channels CH1 and the second channels CH2 may remain without being eliminated, e.g., lost, during a sintering process.

Figure 5:
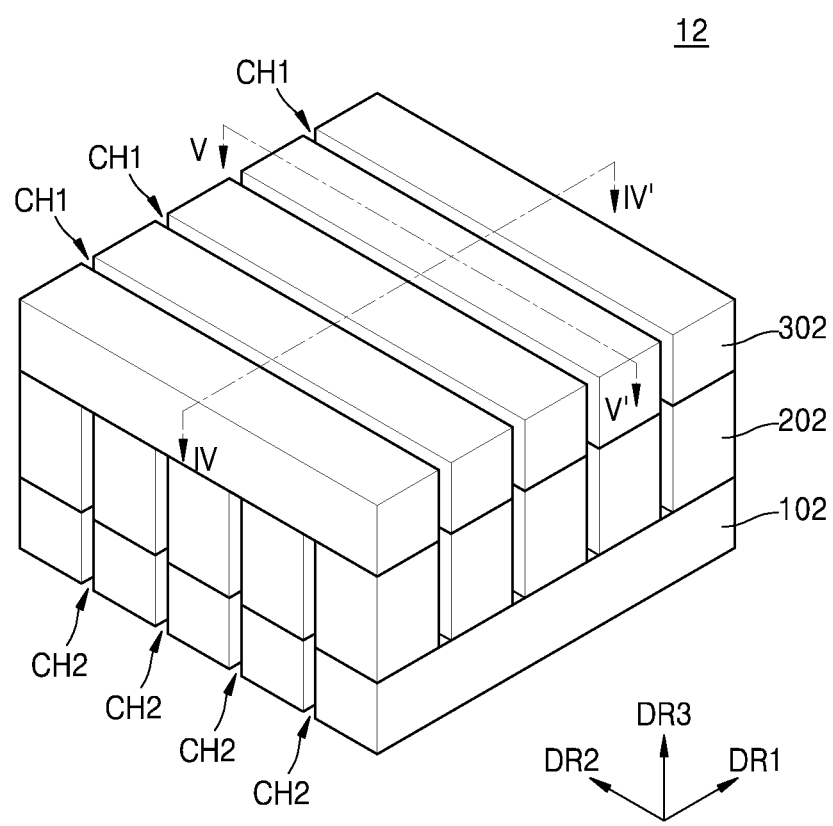
FIG. 5 is a perspective view of an embodiment of an active material structure.
Figure 6A:
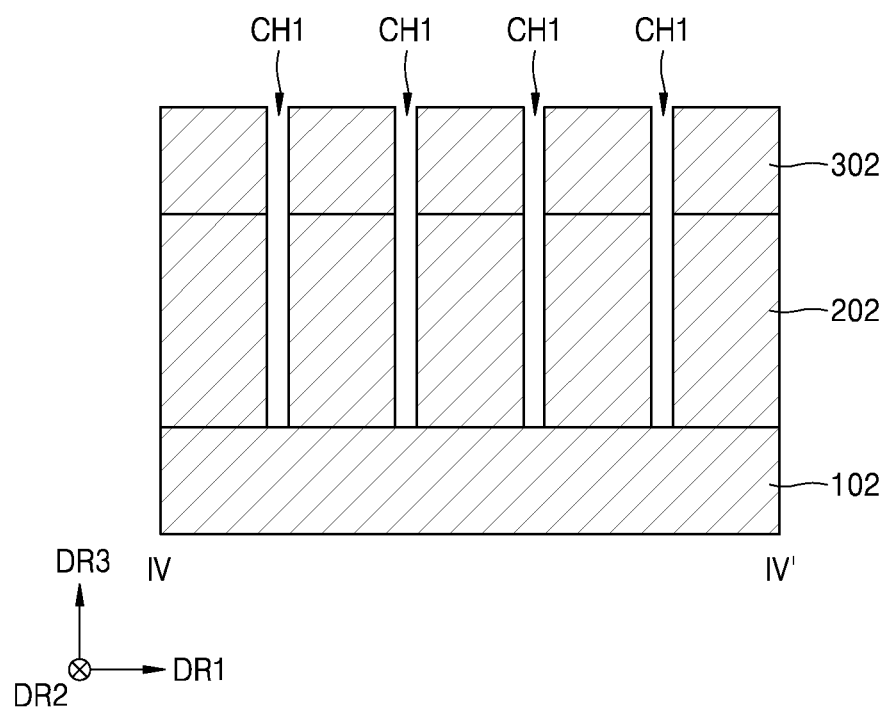
FIG. 6A is a cross-sectional view taken along line IV-IV' of FIG. 5.
Figure 6B:
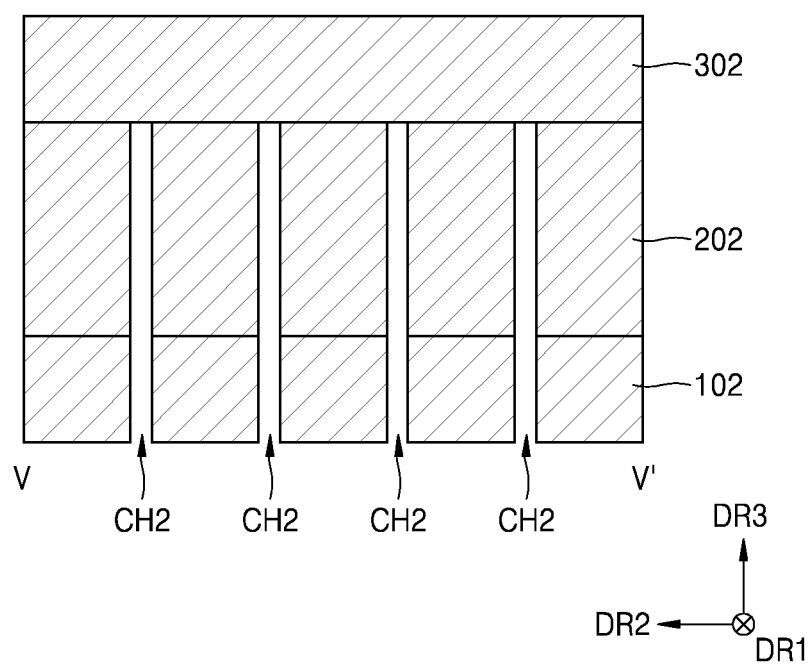
FIG. 6B is a cross-sectional view taken along line V-V' of FIG. 5.

FIG. 5 is a perspective view of an active material structure according to an embodiment. FIG. 6A is a cross-sectional view taken along line IV-IV' of FIG. 5. FIG. 6B is a cross-sectional view taken along line V-V' of FIG. 5. For brevity of description, a description of parts of FIG. 5, FIG. 6A, and FIG. 6B that are substantially the same as those described above with reference to FIG. 1, FIG. 2A, FIG. 2B, FIG. 2C, FIG. 2D, and FIG. 2E may be omitted here.

Referring to FIG. 5, FIG. 6A, and FIG. 6B, an active material structure 12 may be provided. The active material structure 12 may include a cathode active material structure included in a cathode of a secondary battery. The active material structure 12 may include lower active material lines 102, intermediate active material lines 202, and upper active material lines 302.

The lower active material lines 102, the intermediate active material lines 202, and the upper active material lines 302 may be in a multi-layered structure. An interface may be provided between the lower active material lines 102 and the intermediate active material lines 202. The interface between the lower active material lines 102 and the intermediate active material lines 202 may be coplanar with upper surfaces of the lower active material lines 102 exposed via first channels CH1. For example, the interface between the lower active material lines 102 and the intermediate active material lines 202 may be at the same level as the upper surfaces of the lower active material lines 102 exposed via the first channels CH1. An interface may be provided between the upper active material lines 302 and the intermediate active material lines 202. The interface between the upper active material lines 302 and the intermediate active material lines 202 may be coplanar with bottom surfaces of the upper active material lines 302 exposed by second channels CH2. For example, the interface between the upper active material lines 302 and the intermediate active material lines 202 may be at the same level as the upper surfaces of the upper active material lines 302 exposed via the second channels CH2.

The lower active material lines 102, the intermediate active material lines 202, and the upper active material lines 302 may have a first sintered density, a second sintered density, and a third sintered density, respectively. The first sintered density may be less than the second sintered density. The third sintered density may be less than or substantially the same as the second sintered density. For example, when the third sintered density is less than the second sintered density, the third sintered density may be substantially the same as the first sintered density.

The lower active material lines 102, the intermediate active material lines 202, and the upper active material lines 302 may include a first active material, a second active material, and a third active material, respectively. For example, each of the first active material, the second active material, and the third active material may include LCO, NCM, NCA, LMO, or LFP. In one example, the first active material, the second active material, and the third active material may be the same. At least two of the first active material, the second active material, and the third active material may be different from each other.

The active material structure 12 may have high structural stability owing to the first and second channels CH1 and CH2. Accordingly, the active material structure 12 capable of providing a secondary battery having a high energy density may be provided.

Figure 7:
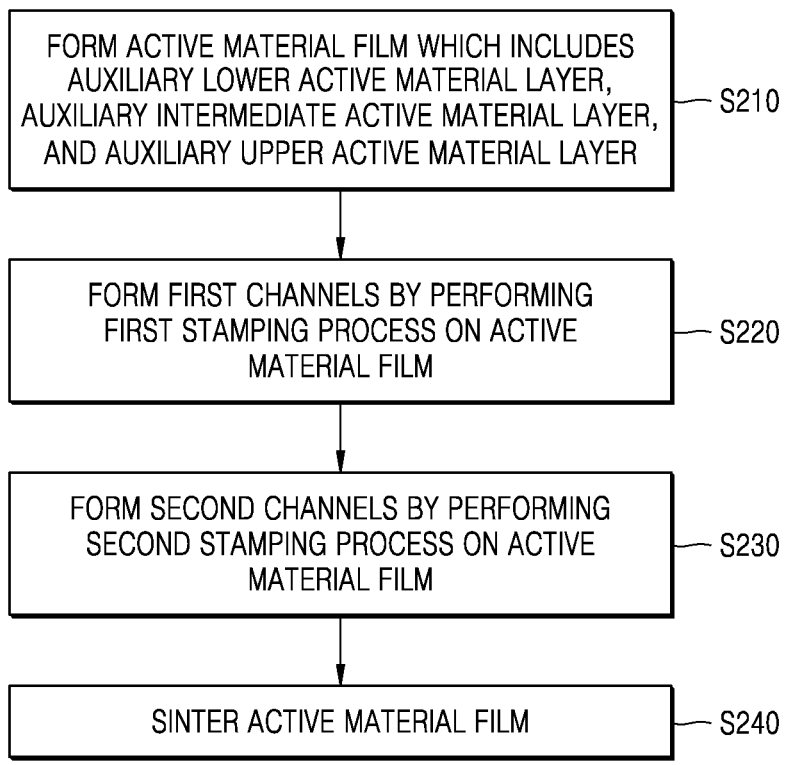
FIG. 7 is a flowchart illustrating a method of fabricating the active material structure of FIG. 5, FIG. 6A, and FIG. 6B.
Figure 8A:
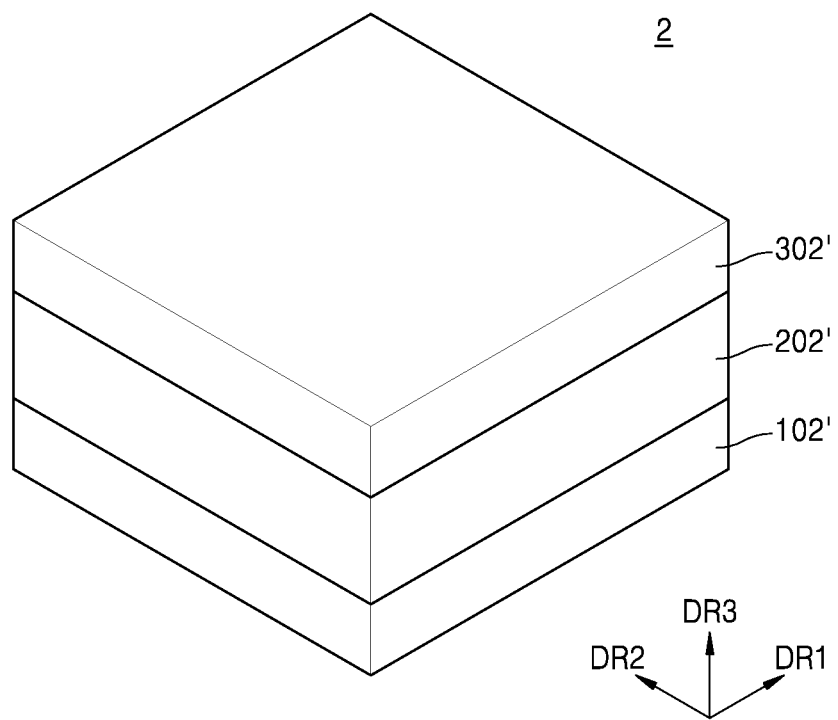
FIG. 8A is a perspective view for explaining the method of fabricating the active material structure of FIG. 7.
Figure 8B:
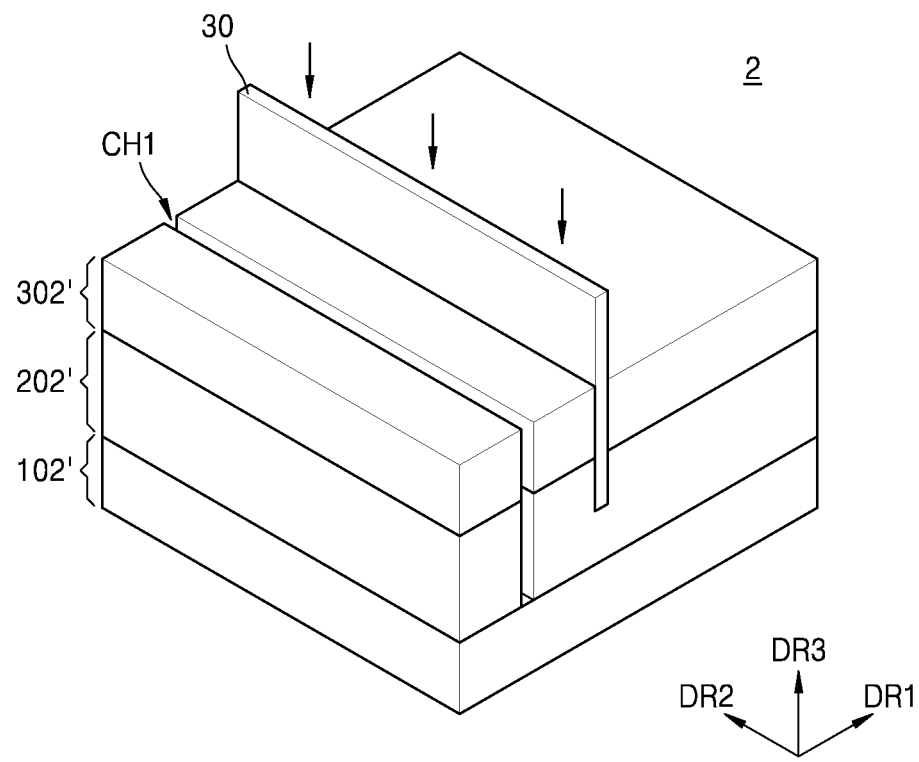
FIG. 8B is a perspective view for explaining the method of fabricating the active material structure of FIG. 7.
Figure 8C:
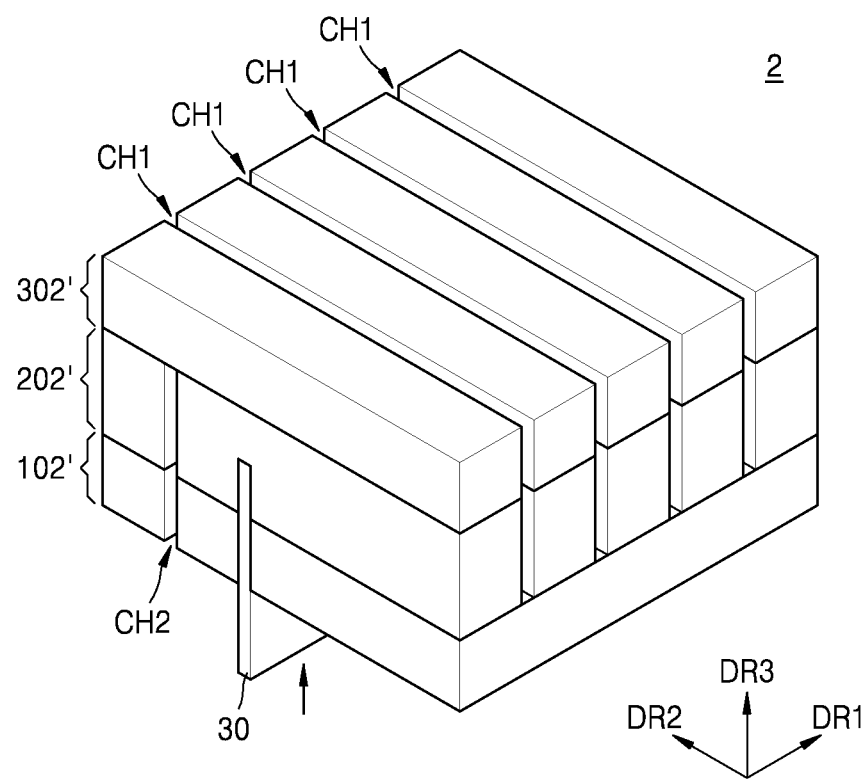
FIG. 8C is a perspective view for explaining the method of fabricating the active material structure of FIG. 7.

FIG. 7 is a flowchart illustrating a method of fabricating the active material structure 12 of FIG. 5, FIG. 6A, and FIG. 6B. FIG. 8A is a perspective view for explaining the method of fabricating the active material structure 12 of FIG. 7. FIG. 8B is a perspective view for explaining the method of fabricating the active material structure 12 of FIG. 7. FIG. 8C is a perspective view for explaining the method of fabricating the active material structure 12 of FIG. 7. For brevity of description, a description of parts of FIG. 7, FIG. 8A, FIG. 8B, and FIG. 8C that are substantially the same as those described above with reference to FIG. 3, FIG. 4A, FIG. 4B, FIG. 4C, and FIG. 4D and FIG. 5, FIG. 6A, and FIG. 6B may be omitted here.

Referring to FIGS. 7 and 8A, an active material film 2 including a preliminary lower active material layer 102', a preliminary intermediate active material layer 202', and a preliminary upper active material layer 302' may be formed (S210). As one example, the active material film 2 may be formed by sequentially forming the preliminary intermediate active material layer 202' and the preliminary upper active material layer 302' on the preliminary lower active material layer 102' by the tape casting method described above with reference to FIG. 4B. The active material film 2 may be formed by laminating the preliminary lower active material layer 102', the preliminary intermediate active material layer 202', and the preliminary upper active material layer 302', which are formed by separate processes. For example, the preliminary lower active material layer 102', the preliminary intermediate active material layer 202', and the preliminary upper active material layer 302' may each be formed using the tape casting method.

Referring to FIGS. 7 and 8B, first channels CH1 may be formed by performing the first stamping process described above with reference to FIGS. 3 and 4C on the active material film 2 (S220). A blade 30 may be inserted into the active material film 2 to be in contact with an upper surface of the preliminary lower active material layer 102'. Accordingly, the upper surface of the preliminary lower active material layer 102' may be exposed via the first channels CH1.

Referring to FIGS. 7 and 8C, second channels CH2 may be formed by performing the second stamping process described above with reference to FIGS. 3 and 4C on the active material film 2 (S230). The blade 30 may be inserted into the active material film 2 to be in contact with a bottom surface of the preliminary upper active material layer 302'. Accordingly, the bottom surface of the preliminary upper active material layer 302' may be exposed via the second channels CH2.

Referring to FIGS. 5 and 7, the active material film 2 may be sintered to form the active material structure 12 (S240).

The active material film 2 of the present embodiment includes the first channels CH1 and the second channels CH2 that cross, e.g., intersect, each other during sintering and thus may have high structural stability. Accordingly, even when the first channels CH1 and the second channels CH2 have a small width, the first channels CH1 and the second channels CH2 may remain without being eliminated, e.g., lost, during the sintering process.

Figure 9:
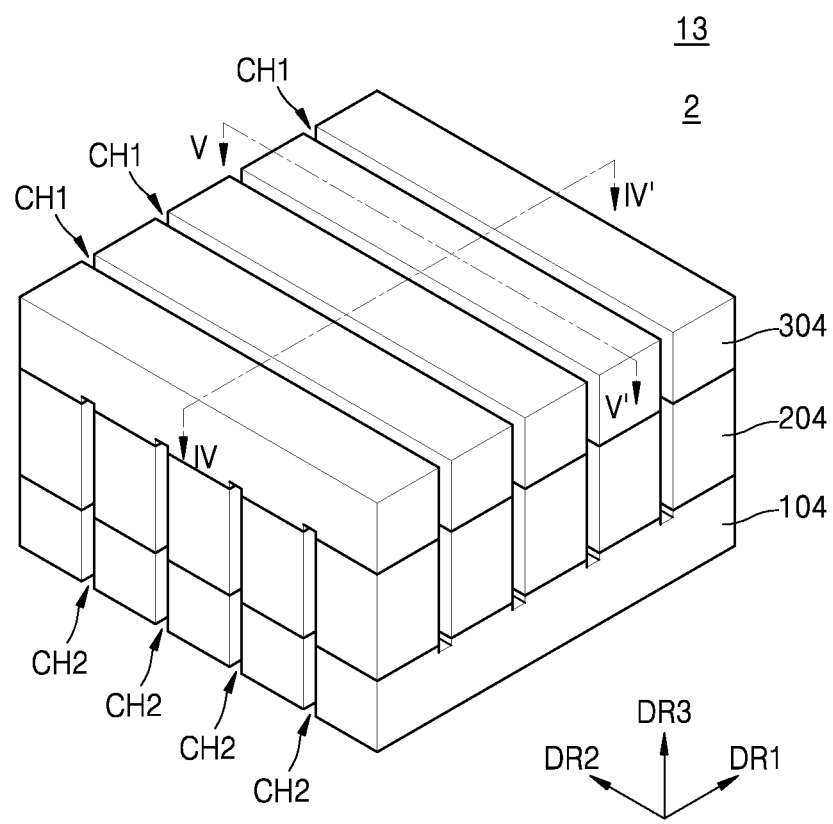
FIG. 9 is a perspective view of an embodiment of an active material structure.
Figure 10A:
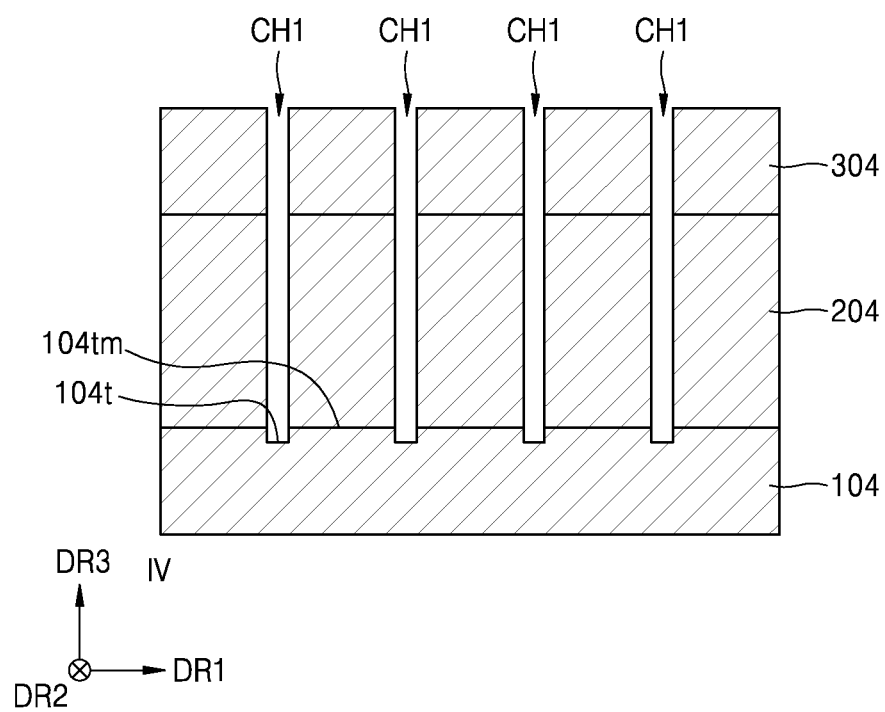
FIG. 10A is a cross-sectional view taken along line IV-IV' of FIG. 9.
Figure 10B:
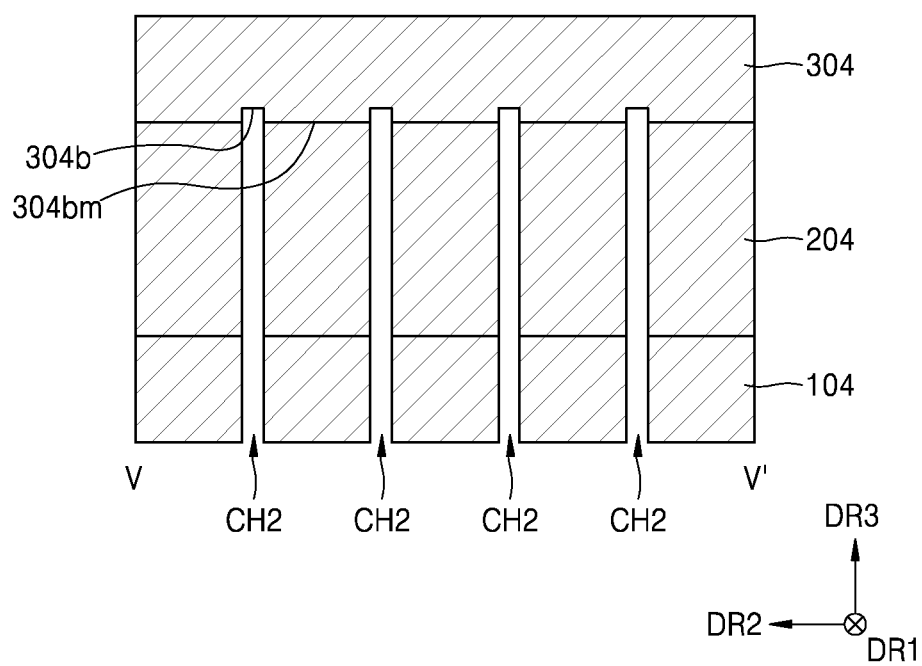
FIG. 10B is a cross-sectional view taken along line V-V' of FIG. 9.

FIG. 9 is a perspective view of an active material structure according to an embodiment. FIG. 10A is a cross-sectional view taken along line IV-IV' of FIG. 9. FIG. 10B is a cross-sectional view taken along line V-V' of FIG. 9. For brevity of description, a description of parts of FIG. 9, FIG. 10A, and FIG. 10B that are substantially the same as those described above with reference to FIG. 1, FIG. 2A, FIG. 2B, FIG. 2C, FIG. 2D, and FIG. 2E and FIG. 5, FIG. 6A, and FIG. 6B may be omitted here.

Referring to FIG. 9, FIG. 10A, and FIG. 10B, an active material structure 13 may be provided. The active material structure 13 may include a cathode active material structure included in a cathode of a secondary battery. The active material structure 13 may include lower active material lines 104, intermediate active material lines 204, and upper active material lines 304. First channels CH1 may extend in a third direction DR3 to be recessed in upper portions of the lower active material lines 104. There may be a step between upper surfaces 104$t$ of the lower active material lines 104 exposed via the first channels CH1 and uppermost surfaces 104$tm$ of the lower active material lines 104. The upper surfaces 104$t$ of the lower active material lines 104 exposed via the first channels CH1 may be at a lower level than the uppermost surfaces 104$tm$ of the lower active material lines 104. The distance between the upper surfaces 104$t$ of the lower active material lines 104 exposed via the first channels CH1 and bottom surfaces of the lower active material lines 104 may be less than the distance between the uppermost surfaces 104$tm$ and the bottom surfaces of the lower active material lines 104.

Second channels CH2 may extend in the third direction DR3 to be recessed in lower portions of the upper active material lines 304. There may be a step between bottom surfaces 304$b$ of the upper active material lines 304 exposed via the second channels CH2 and lowermost surfaces 304$bm$ of the upper active material lines 304. The bottom surfaces 304$b$ of the upper active material lines 304 exposed via the second channels CH2 may be at a higher level than the lowermost surfaces 304$bm$ of the upper active material lines 304. The distance between the bottom surfaces 304$b$ of the upper active material lines 304 exposed via the second channels CH2 and the upper surfaces of the upper active material lines 304 may be less than the distance between the lowermost surfaces 304$bm$ and the upper surfaces of the upper active material lines 304.

The active material structure 12 of an embodiment may have high structural stability owing to the first and second channels CH1 and CH2. Accordingly, the active material structure 13 for providing a secondary battery having a high energy density may be provided.

Figure 11:
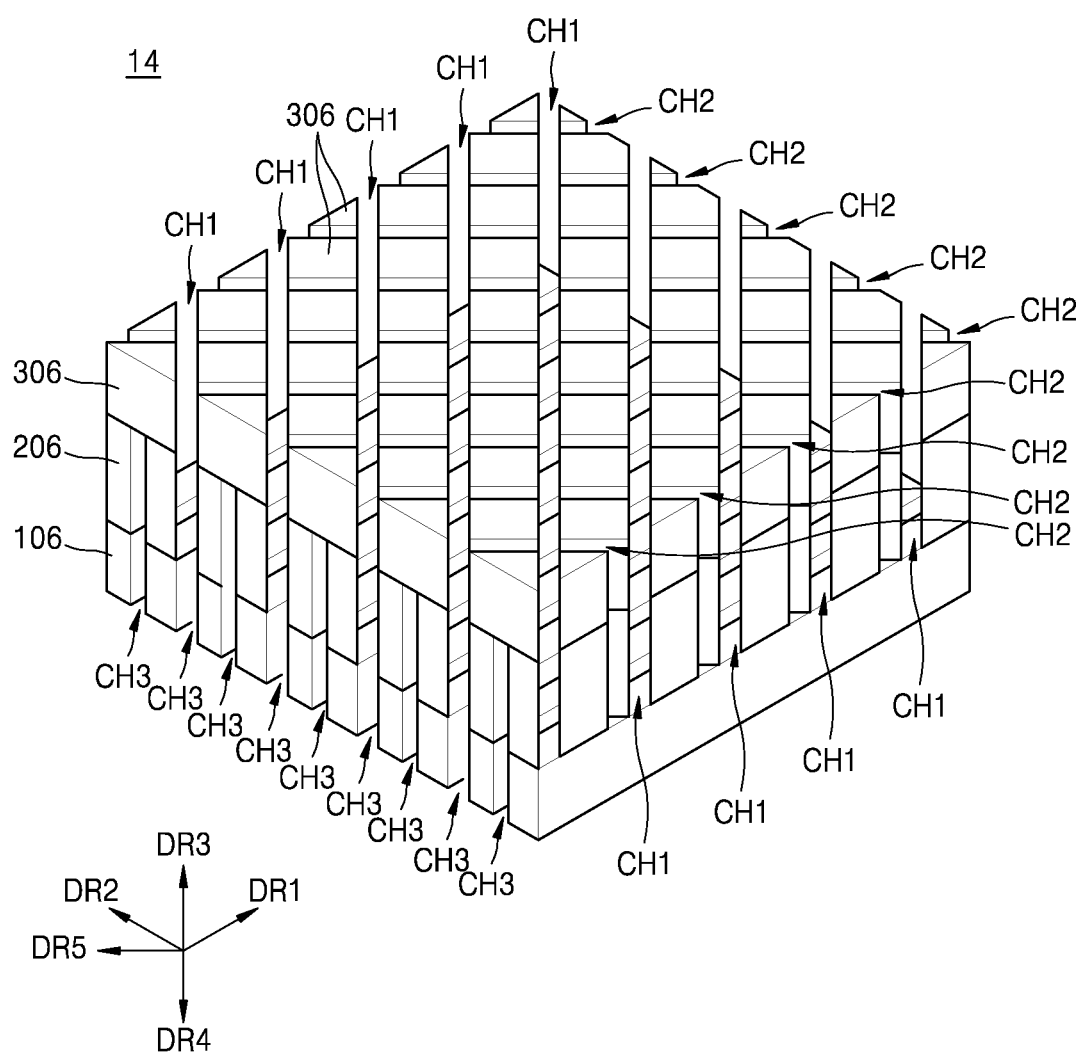
FIG. 11 is a perspective view of an embodiment of an active material structure.
Figure 12:
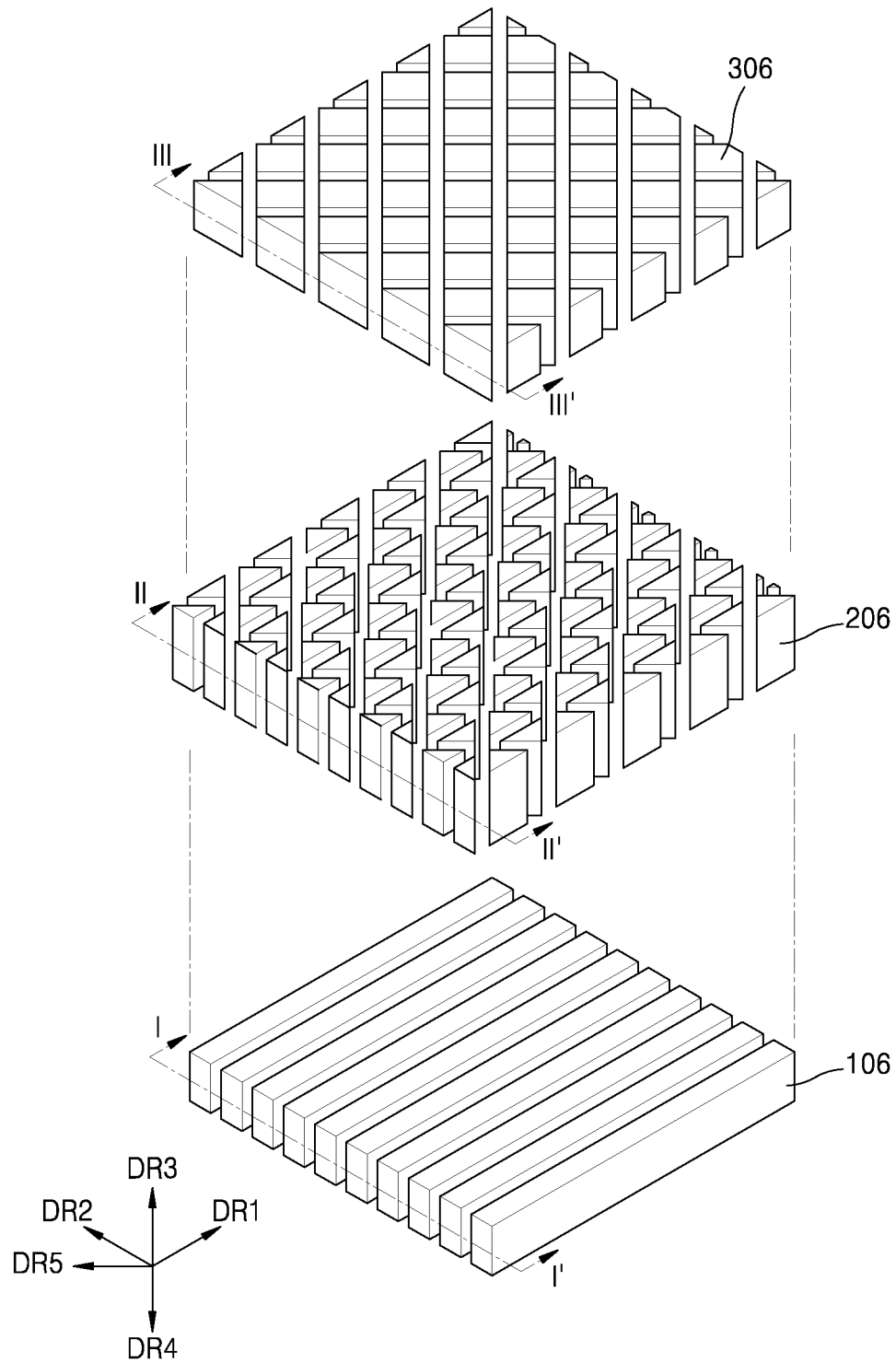
FIG. 12 is an exploded perspective view of the active material structure of FIG. 11.
Figure 13A:
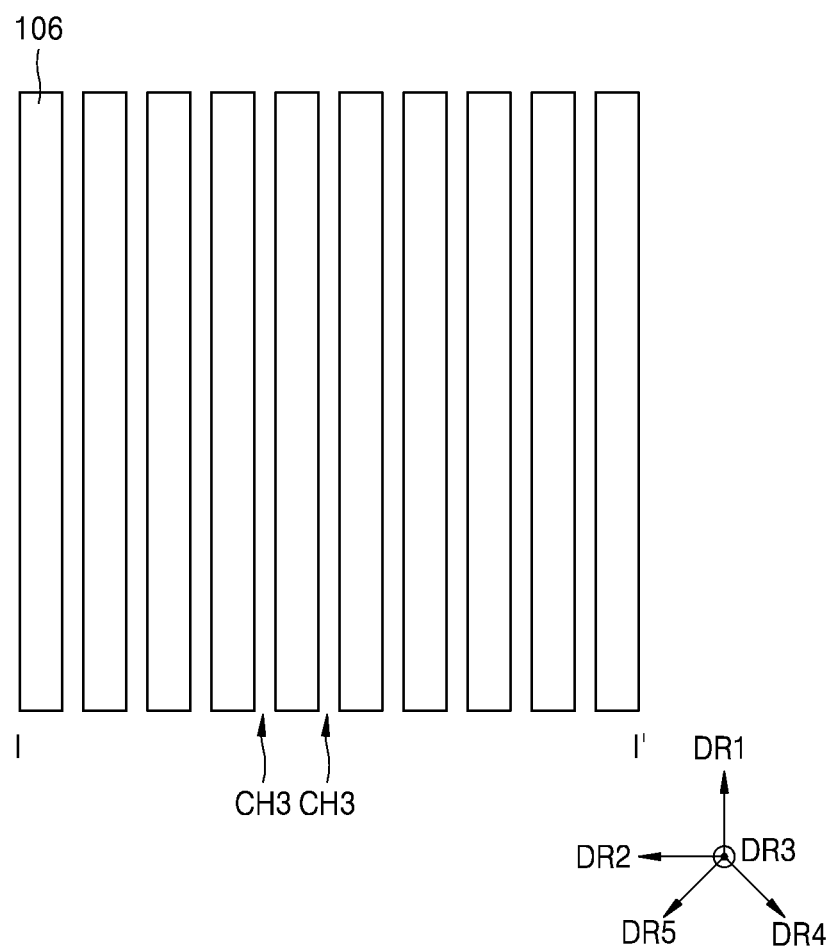
FIG. 13A is a cross-sectional view taken along line I-I' of the active material structure of FIG. 12.
Figure 13B:
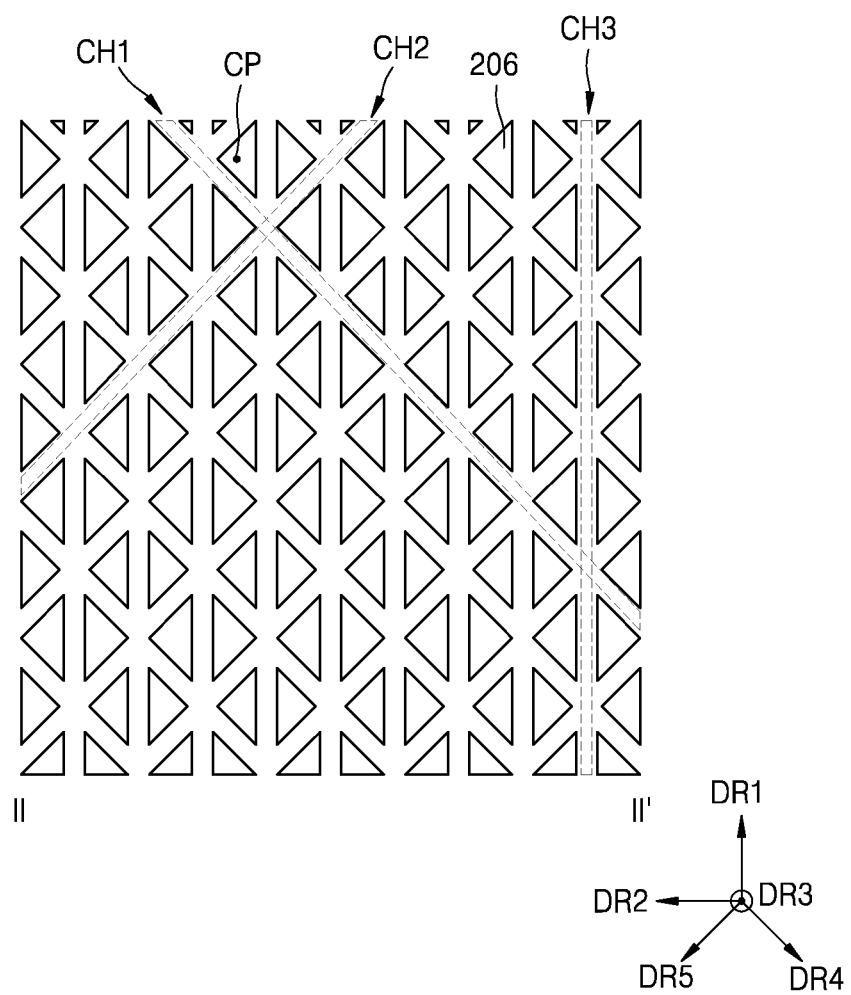
FIG. 13B is a cross-sectional view taken along line II-II' of the active material structure of FIG. 12.
Figure 13C:
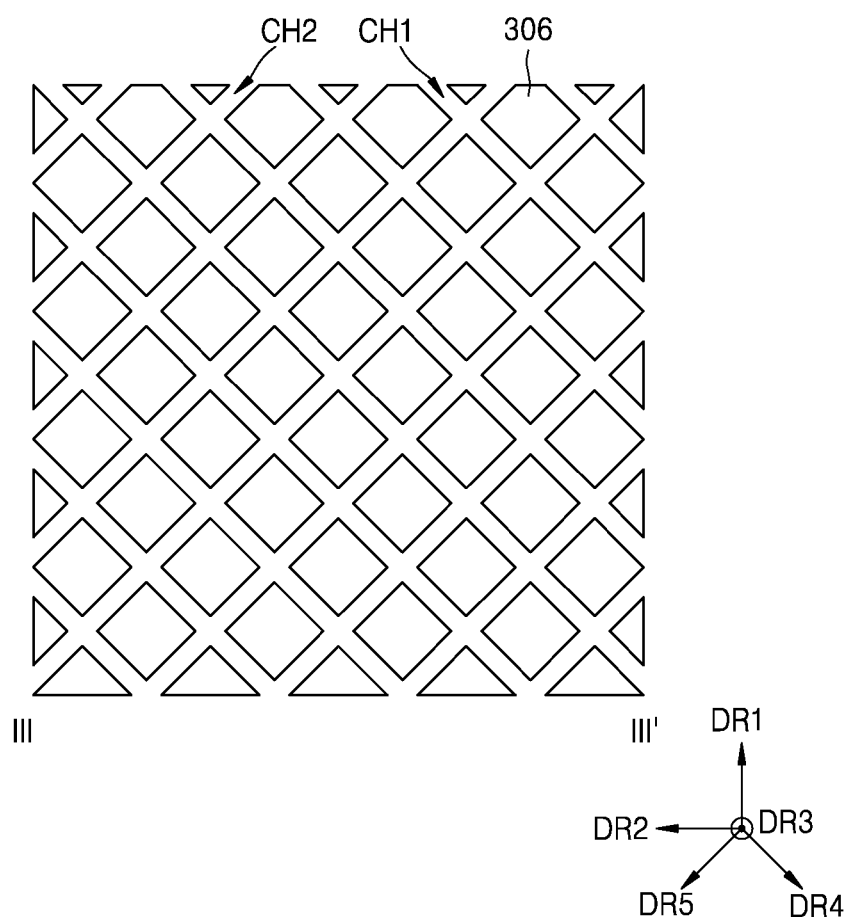
FIG. 13C is a cross-sectional view taken along line III-III' of the active material structure of FIG. 12.

FIG. 11 is a perspective view of an active material structure according to an embodiment. FIG. 12 is an exploded perspective view of the active material structure of FIG. 11. FIG. 13A is a cross-sectional view taken along line I-I' of the active material structure of FIG. 12. FIG. 13B is a cross-sectional view taken along line II-II' of the active material structure of FIG. 12. FIG. 13C is a cross-sectional view taken along line III-III' of the active material structure of FIG. 12. For brevity of description, a description of parts of FIG. 11, FIG. 12, FIG. 13A, FIG. 2B, and FIG. 13C that are substantially the same as those described above with reference to FIG. 1, FIG. 2A, FIG. 2B, FIG. 2C, FIG. 2D, and FIG. 2E and FIG. 5, FIG. 6A, and FIG. 6B may be omitted here.

Referring to FIG. 11, FIG. 12, FIG. 13A, FIG. 2B, and FIG. 13C, an active material structure 14 may be provided. The active material structure 12 may be a cathode active material structure included in a cathode of a secondary battery. The active material structure 14 may include lower active material lines 106, intermediate active material lines 206, and upper active material lines 306.

Unlike that described above with reference to FIG. 5, FIG. 6A, and FIG. 6B, the upper active material lines 306 may be arranged in a fourth direction DR4 and a fifth direction DR5. The fourth direction DR4 and the fifth direction DR5 may respectively cross, e.g., intersect, the first direction DR1 and the second direction DR2 and intersect, e.g., be perpendicular to, the third direction DR3. The upper active material lines 306 may extend in the third direction DR3.

Each of first channels CH1 may be provided between the upper active material lines 306 arranged in the fifth direction DR5. Each of second channels CH2 may be provided between the upper active material lines 306 arranged in the fourth direction DR4. The first channels CH1 and the second channels CH2 may extend between the intermediate active material lines 206. The first channels CH1 may be provided between the intermediate active material lines 206 arranged in the fifth direction DR5 to expose upper surfaces of the lower active material lines 106. The second channels CH2 may be provided between the intermediate active material lines 206 arranged in the fourth direction DR4 to expose the upper surfaces of the lower active material lines 106. The first channels CH1 and the second channels CH2 may cross, e.g., intersect, each other between the upper active material lines 306 and the intermediate active material lines 206.

Each of third channels CH3 may be provided between the lower active material lines 106. The lower active material lines 106 and the third channels CH3 may be substantially the same as the lower active material lines 102 and the second channels CH2 described above with reference to FIG. 5, FIG. 6A, and FIG. 6B. The third channels CH3 may extend between the intermediate active material lines 206. The third channels CH3 may be provided between the intermediate active material lines 206 arranged in the second direction DR2 to expose the upper surfaces of the lower active material lines 306.

The first channels CH1, the second channels CH2, and the third channels CH3 may cross, e.g., intersect, one another between the intermediate active material lines 206.

In an embodiment, numerical values of the active material structure 14 may be as follows. A size, e.g., thickness, of the active material structure 14 in the third direction DR3 may be in a range of about 50 µm to about 1,000 µm, for example, about 100 µm to about 900 µm, about 200 µm to about 800 µm, or about 300 µm to about 700 µm. A width of each of the first to third channels CH1, CH2, and CH3 may be in a range of about 0.5 µm to about 10 µm for example, about 1 µm to about 9 µm, about 2 µm to about 8 µm, or about 3 µm to about 7 µm. A depth of each of the first to third channels CH1, CH2, and CH3 may be in a range of about 50% to about 80%, for example, about 55% to about 75%, or about 60% to about 70%, of the size, e.g., thickness, of the active material structure 14 in the third direction DR3. The depths of the first to third channels CH1, CH2, and CH3 are measured in the third direction DR3. The sum of the distances between central points CP on the intermediate active material lines 206 and two channels adjacent to the central points CP may be referred to as a channel distance. For example, the two channels may refer to the first channel CH1 and the second channel CH2 immediately adjacent to each other, the first channel CH1 and the third channel CH3 immediately adjacent to each other, or the third channel CH3 and the second channel CH2 immediately adjacent to each other. The channel distance may be in a range of about 1 µm to about 500 µm for example, about 50 µm to about 450 µm, about 100 µm to about 400 µm, or about 150 µm to about 350 µm. The channel distance may refer to a size of each of the first to third channels CH1, CH2, and CH3 in a direction intersecting, e.g., perpendicular to, the direction in which the first to third channels CH1, CH2, and CH3 extend.

The active material structure 14 of an embodiment may have high structural stability owing to the first to third channels CH1, CH2, and CH3. Accordingly, the active material structure 14 for providing a secondary battery having a high energy density may be provided.

Figure 14:
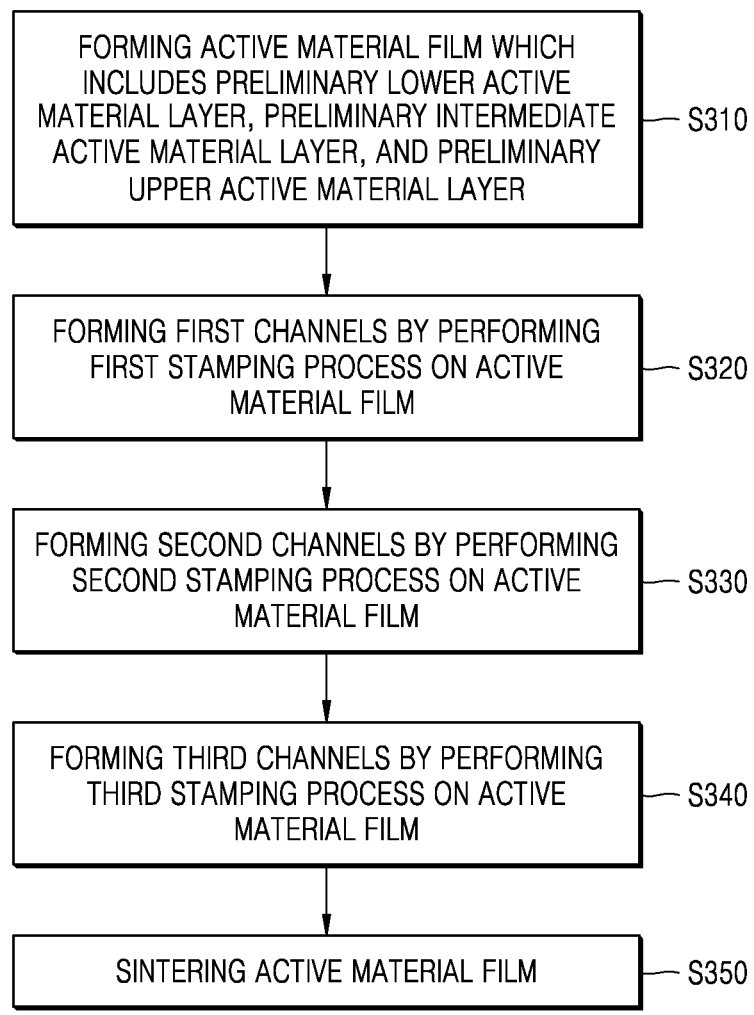
FIG. 14 is a flowchart of a method of fabricating the active material structure of FIG. 11, FIG. 12, FIG. 13A, FIG. 2B, and FIG. 13C.
Figure 15A:
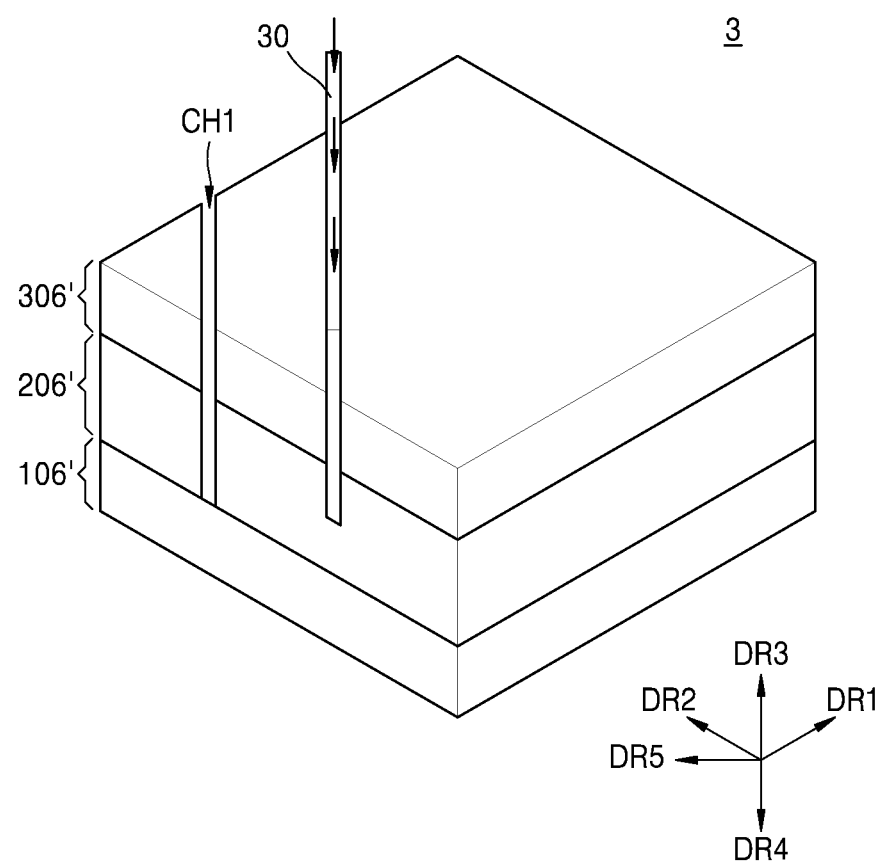
FIG. 15A is a perspective view for explaining the method of fabricating the active material structure of FIG. 14.
Figure 15B:
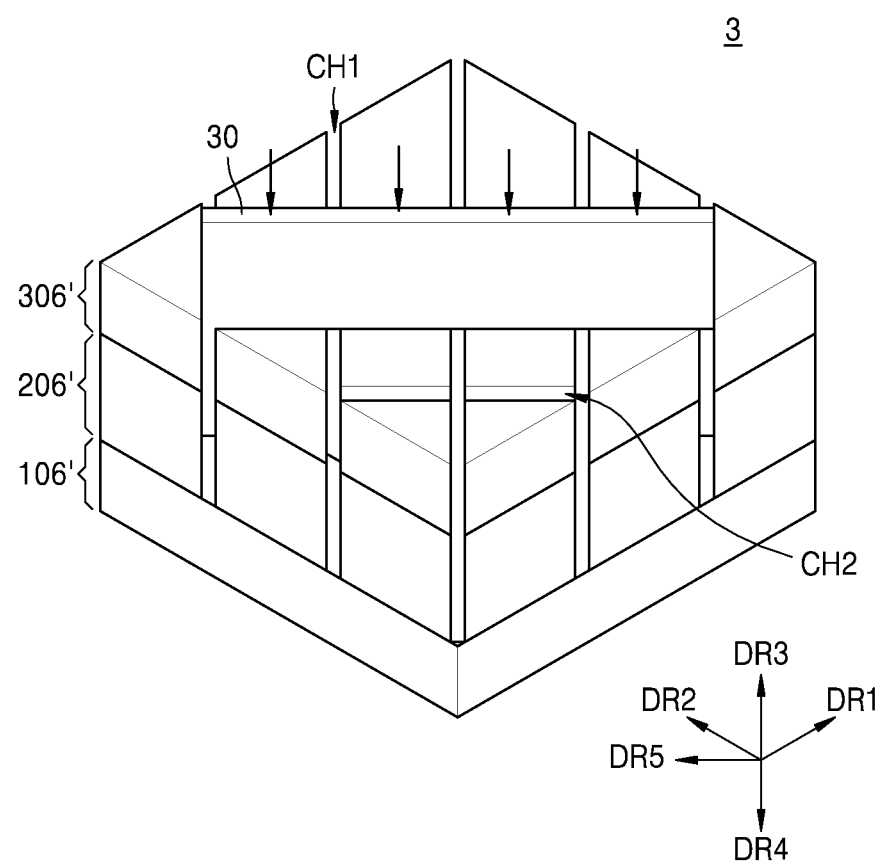
FIG. 15B is a perspective view for explaining the method of fabricating the active material structure of FIG. 14.
Figure 15C:
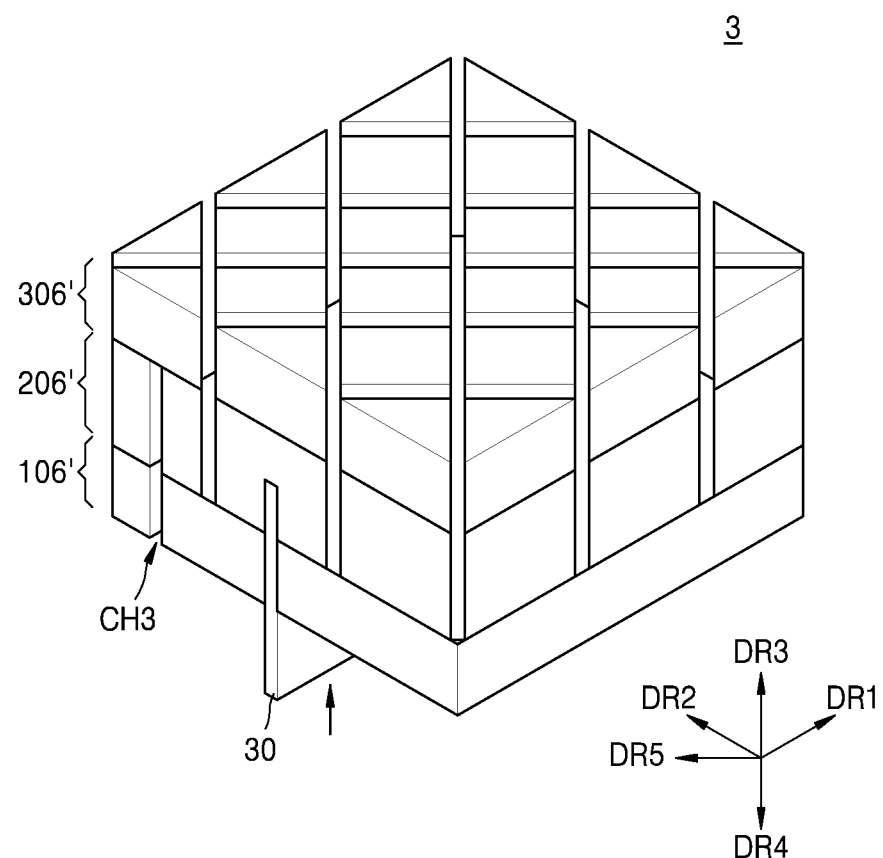
FIG. 15C is a perspective view for explaining the method of fabricating the active material structure of FIG. 14.

FIG. 14 is a flowchart of a method of fabricating the active material structure 14 of FIG. 11, FIG. 12, FIG. 13A, FIG. 2B, and FIG. 13C. FIG. 15A is a perspective view for explaining the method of fabricating the active material structure 14 of FIG. 14. FIG. 15B is a perspective view for explaining the method of fabricating the active material structure 14 of FIG. 14. FIG. 15C is a perspective view for explaining the method of fabricating the active material structure 14 of FIG. 14. For brevity of description, a description of parts of FIG. 14, FIG. 15A, FIG. 15B, and FIG. 15C that are substantially the same as those described above with reference to FIG. 3, FIG. 4A, FIG. 4B, FIG. 4C, and FIG. 4D and FIG. 11, FIG. 12, FIG. 13A, FIG. 13B, and FIG. 13C may be omitted here.

Referring to FIG. 14, an active material film 3 including a preliminary lower active material layer 106', a preliminary intermediate active material layer 206', and a preliminary upper active material layer 306' may be formed (S310). As one example, the active material film 3 may be formed by sequentially forming the preliminary intermediate active material layer 206' and the preliminary upper active material layer 306' on the preliminary lower active material layer 106' by the tape casting method described above with reference to FIG. 4B. The active material film 3 may be formed by forming the preliminary lower active material layer 106', the preliminary intermediate active material layer 206', and the preliminary upper active material layer 306' by the tape casting method and laminating the preliminary lower active material layer 106', the preliminary intermediate active material layer 206', and the preliminary upper active material layer 306'.

Referring to FIGS. 14 and 15A, a first stamping process may be performed on the active material film 3 to form first channels CH1 (S320). Except for a direction of alignment of a blade 30, the first stamping process may be substantially the same as the first stamping process described above with reference to FIGS. 3 and 4C. Unlike that illustrated in FIGS. 3 and 4C, the blade 30 may be aligned to be parallel to the fourth direction DR4. The blade 30 may be inserted into the active material film 3 to be in contact with an upper surface of the preliminary lower active material layer 106'. Accordingly, the first channels CH1 may be formed to expose the upper surface of the preliminary lower active material layer 106'.

Referring to FIGS. 14 and 15B, a second stamping process may be performed on the active material film 3 to form second channels CH2 (S330). Except for the direction of alignment of the blade 30, the second stamping process may be substantially the same as the first stamping process described above with reference to FIGS. 3 and 4C. Unlike that illustrated in FIGS. 3 and 4C, the blade 30 may be aligned to be parallel to the fifth direction DR5. The blade 30 may be inserted into the active material film 3 to be in contact with the upper surface of the preliminary lower active material layer 106'. Accordingly, the second channels CH2 may be formed to expose the upper surface of the preliminary lower active material layer 106'. The first channels CH1 and the second channels CH2 may be formed to cross, e.g., intersect, each other on the preliminary upper active material layer 306' and the preliminary intermediate active material layer 206'.

Referring to FIGS. 14 and 15C, third channels CH3 (S340) may be formed, for example, by any suitable process, such as by stamping, e.g., a third stamping process may be performed on the active material film 3 to form third channels CH3 (S340). The third stamping process may be substantially the same as the second stamping process described above with reference to FIGS. 3 and 4D. The blade 30 may be aligned to be parallel to the first direction DR1. The blade 30 may be inserted into the active material film 3 to be in contact with a bottom surface of the preliminary upper active material layer 306'. Accordingly, the bottom surface of the preliminary upper active material layer 306' may be exposed via the third channels CH3.

Referring to FIGS. 14 and 11, the active material film 3 may be sintered to form the active material structure 14 (S350).

The active material film 3 of an embodiment of the present embodiment includes the first channels CH1 and the second channels CH2 that cross, e.g., intersect, each other during sintering and thus may have high structural stability. Accordingly, even when the first channels CH1, the second channels CH2, and the third channel CH3 have a small width, the first to third channels CH1, CH2, and CH3 may remain without being eliminated, e.g., lost, during a sintering process.

Figure 16:
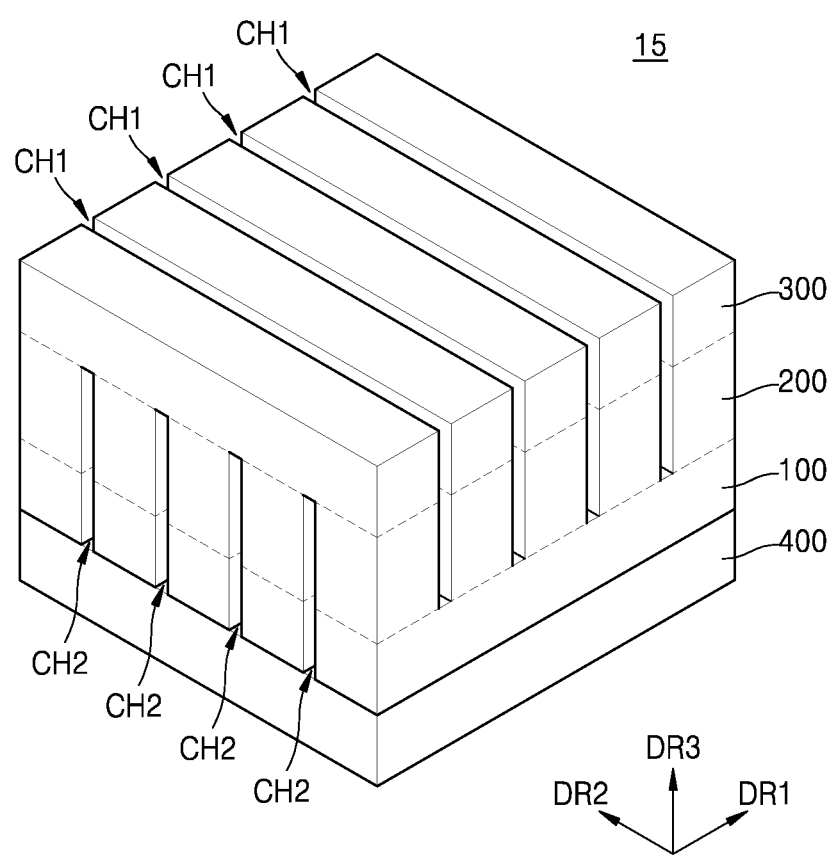
FIG. 16 is a perspective view of an embodiment of an electrode structure.

FIG. 16 is a perspective view of an electrode structure according to an embodiment. For brevity of description, a description of parts of FIG. 16 that are substantially the same as those described above with reference to FIG. 1, FIG. 2A, FIG. 2B, FIG. 2C, FIG. 2D, and FIG. 2E may be omitted here.

Referring to FIG. 16, an electrode structure 15 may be provided. The electrode structure 15 may include a cathode structure of a secondary battery. The electrode structure 15 may include a current collector layer 400 and an active material structure on the current collector layer 400. The active material structure may include lower active material lines 100, intermediate active material lines 200, and upper active material lines 300. The active material structure may be substantially the same as the active material structure 11 of FIG. 1, FIG. 2A, FIG. 2B, FIG. 2C, FIG. 2D, and FIG. 2E described above with reference to FIG. 1, FIG. 2A, FIG. 2B, FIG. 2C, FIG. 2D, and FIG. 2E. The active material structure may be substantially the same as one of the active material structures 12, 13, and 14 described above.

The current collector layer 400 may be provided on bottom surfaces of the lower active material lines 100. For example, the current collector layer 400 may be in direct contact with the bottom surfaces of the lower active material lines 100. An upper surface of the current collector layer 400 may be exposed via second channels CH2. The upper surface of the current collector layer 400 may face the bottom surfaces of the upper active material lines 300 with the second channels CH2 therebetween.

The current collector layer 400 may include a cathode current collector material. The current collector layer 400 may include a conductive material. For example, the current collector layer 400 may include at least one of copper (Cu), gold (Au), platinum (Pt), silver (Ag), zinc (Zn), aluminum (Al), magnesium (Mg), titanium (Ti), iron (Fe), cobalt (Co), nickel (Ni), germanium (Ge), indium (In), or lead (Pd).

The electrode structure 40 of an embodiment may include the active material structure having high structural stability owing to the first and second channels CH1 and CH2. Accordingly, the electrode structure 15 for providing a secondary battery having a high energy density may be provided.

Figure 17:
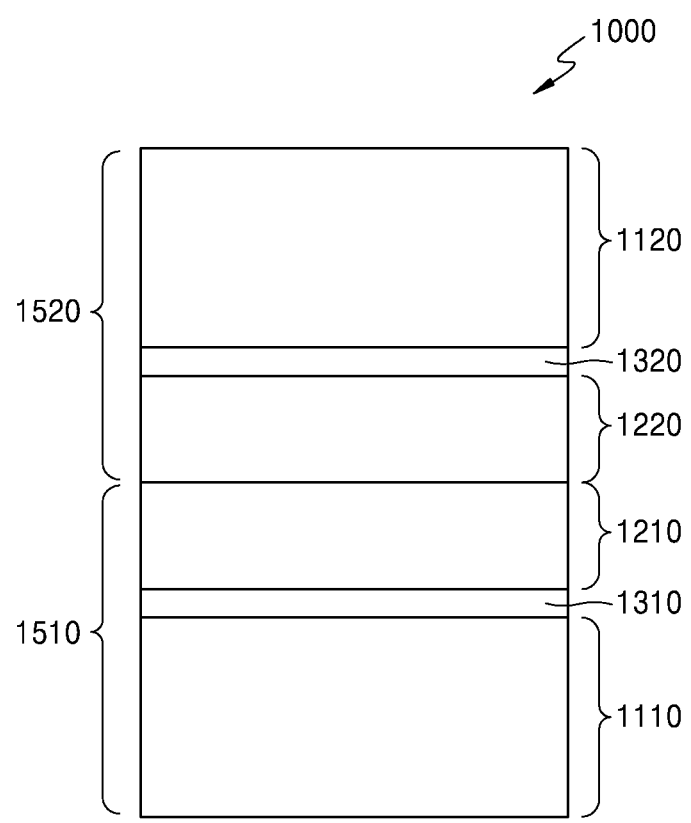
FIG. 17 is a conceptual diagram of an embodiment of a secondary battery.

FIG. 17 is a conceptual diagram of a secondary battery according to an embodiment. For the sake of brevity, a description of parts of FIG. 17 that are substantially the same as those described above with reference to FIG. 1, FIG. 2A, FIG. 2B, FIG. 2C, FIG. 2D, and FIGS. 2E and 16 may be omitted here.

Referring to FIG. 17, a secondary battery 1000 may be provided. The secondary battery 1000 may include a pair of sub-secondary batteries 1510 and 1520. The secondary battery 1000 may include one sub-secondary battery or three or more sub-secondary batteries.

The pair of sub-secondary batteries 1510 and 1520 may include lower electrode structures 1110 and 1120, upper electrode structures 1210 and 1220, and separators 1310 and 1320. Each of the lower electrode structures 1110 and 1120 may be a cathode structure. Each of the upper electrode structures 1210 and 1220 may be an anode structure.

Each of the lower electrode structures 1110 and 1120 may be an electrode structure which includes one of the active material structures 11, 12, 13, and 14 described above. For example, each of the lower electrode structures 1110 and 1120 may be substantially the same as the electrode structure 30 described above with reference to FIG. 16.

The upper electrode structures 1210 and 1220 may be provided to be separated from the lower electrode structures 1110 and 1210. Each of the upper electrode structures 1210 and 1220 may include an anode current collector layer (not shown) and an anode active material structure (not shown).

The anode current collector layer may include a conductive material. For example, the anode current collector layer may include at least one of a copper foil, a nickel foil, a stainless steel foil, a titanium foil, a nickel foam, a copper foam, or a polymer substrate coated with a conductive metal.

The anode active material structure may include a cathode active material. For example, the anode active material structure may include a composition containing a material for reversibly intercalating/deintercalating lithium ions, a lithium metal, a lithium metal alloy, a material for doping and dedoping lithium, a transition metal oxide, and the like. The anode active material structure may further include a binder, a conductive material, and/or a thickener. The anode active material structure may include pores.

The separators 1310 and 1320 may be respectively provided between the lower electrode structure 1110 and the upper electrode structure 1210 and between the lower electrode structure 1120 and the upper electrode structure 1220. The separators 1310 and 1320 may separate the lower electrode structures 1110 and 1120 from the upper electrode structures 1210 and 1220 and provide a passage for lithium ions. The separators 1310 and 1320 may have low resistance to ion migration of an electrolyte and have excellent electrolytic solution moisture absorption capacity. For example, the separators 1310 and 1320 may include at least one of glass fiber, polyester, polyethylene ("PE"), polypropylene ("PP"), or polytetrafluoroethylene ("PTFE"). For example, the separators 1310 and 1320 may be in a nonwoven or woven form. For example, the separators 1310 and 1320 may be coated with a coating film containing a ceramic component or a polymer material and thus have excellent heat resistance or mechanical strength. The separator 1310 may have a single layer or a multilayer structure.

The lower electrode structures 1110 and 1120, the upper electrode structures 1210 and 1220, and the separators 1310 and 1320 may be surrounded with a housing (not shown). The housing may have various shapes as required.

An electrolyte (not shown) may be provided in the housing. Accordingly, channels in the active material structures of the lower electrode structures 1110 and 1120 may be filled with the electrolyte. Pores in the anode active material structures of the upper electrode structures 1210 and 1220 may be filled with an electrolyte.

The secondary battery 1000 of an embodiment may include the lower electrode structures 1110 and 1120, which include an active material structure having high structural stability owing to the first and second channels CH1 and CH2. Accordingly, the secondary battery 1000 having a high energy density may be provided.

The present disclosure may provide an active material structure having high structural stability.

The present disclosure may provide an electrode structure and a secondary battery having a high energy density.

The present disclosure may provide a manufacturing method of an active material structure having high structural stability.

However, effects are not limited thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An active material structure comprising:
   first active material lines arranged in a first direction;
   second active material lines arranged in a second direction intersecting the first direction;
   intermediate active material lines between the first active material lines and the second active material lines in a third direction intersecting the first direction and the second direction, the intermediate active material lines provided in overlapping regions of the first active material lines and the second active material lines;
   first channels extending in the first active material layer and the intermediate active material layer in a first direction; and
   second channels extending in the second active material layer and the intermediate active material layer in a second direction intersecting the first direction,
   wherein the first active material lines and the second active material lines are electrically connected by the intermediate active material lines, and
   wherein the first active material lines, the second active material lines, the intermediate active material lines, or a combination thereof comprises a cathode active material,
   wherein a depth of a first channel measured in the third direction is about 50% to about 80% of a thickness of the active material structure measured in the third direction, and
   wherein a depth of a second channel measured in the third direction is about 50% to about 80% of the thickness of the active material structure.

2. The active material structure of claim 1, wherein a length of an intermediate active material line measured in the first direction is equal to a width of the intermediate active material line measured in the second direction.

3. The active material structure of claim 1, wherein the intermediate active material lines comprise
   a first pair of intermediate active material lines adjacent to each other in the first direction, and
   a second pair of intermediate active material lines adjacent to each other in the second direction; and
   a distance in the first direction between the first pair of intermediate active material lines is equal to a distance in the second direction between the second pair of intermediate active material lines.

4. The active material structure of claim 1, wherein the intermediate active material lines extend in the third direction.

5. The active material structure of claim 1, wherein
   the first active material lines extend in the second direction, and
   the second active material lines extend in the first direction.

6. The active material structure of claim 1, wherein
   a second active material line has a length measured in the third direction, and
   an intermediate active material line has a width measured in the third direction,
   wherein the width of the intermediate active material line is greater than the length of the second active material line.

7. The active material structure of claim 6, wherein
   a first active material line has a thickness measured in the third direction,
   wherein the width of the intermediate active material line is greater than the thickness of the first active material line.

8. The active material structure of claim 7, wherein the length of the second active material line is equal to the thickness of the first active material line.

9. The active material structure of claim 1, wherein
   the second active material lines have a first sintered density,
   the intermediate active material lines have a second sintered density, and
   the first active material lines have a third sintered density, wherein the first sintered density, the second sintered density, and the third sintered density are equal.

10. The active material structure of claim 1, wherein
    the second active material lines have a first sintered density,
    the intermediate active material lines have a second sintered density, and
    the first active material lines have a third sintered density,
    wherein the second sintered density is greater than the first sintered density and the third sintered density.

11. The active material structure of claim 10, wherein the first sintered density and the third sintered density are equal.

12. The active material structure of claim 1, wherein
    the second active material lines have a first sintered density,
    the intermediate active material lines have a second sintered density, and
    the first active material lines have a third sintered density,
    wherein the first sintered density is less than the second sintered density and the third sintered density.

13. The active material structure of claim 12, wherein the second sintered density and the third sintered density are equal.

14. The active material structure of claim 1, wherein
    the second active material lines comprise a first active material,
    the intermediate active material lines comprise a second active material, and
    the first active material lines comprise a third active material, wherein the first active material, the second active material, and the third active material are the same.

15. The active material structure of claim 1, wherein
the second active material lines comprise a first active material,
the intermediate active material lines comprise a second active material, and
the first active material lines comprise a third active material,
wherein at least two of the first active material, the second active material, and the third active material are different.

16. The active material structure of claim 1, wherein
a side surface of an intermediate active material line of the intermediate active material lines comprises at least one of a (101) plane or an {hk0} plane,
wherein h and k each represent an integer greater than or equal to 1 and are the same, and
wherein the intermediate active material line comprises $LiCoO_2$, $Li(Ni_aCO_bMn_{1-a-b})O_2$, wherein $0 \leq a \leq 1$, $0 \leq b \leq 1$, and $a+b=1$, $Li(Ni_xCo_yAl_{1-x-y})O_2$, wherein $0 \leq x \leq 1$, $0 \leq y \leq 1$, and $x+y=1$, $LiMn_2O_4$, or $LiFePO_4$.

17. The active material structure of claim 16, wherein a side surface of a second active material line of the second active material lines comprises at least one of a (101) plane or an {hk0} plane, and wherein the second active material line comprises $LiCoO_2$, $Li(Ni_aCO_bMn_{1-a-b})O_2$, wherein $0 \leq a \leq 1$, $0 \leq b \leq 1$, and $a+b=1$, $Li(Ni_xCo_yAl_{1-x-y})O_2$, wherein $0 \leq x \leq 1$, $0 \leq y \leq 1$, and $x+y=1$, $LiMn_2O_4$, or $LiFePO_4$.

18. The active material structure of claim 17, wherein a side surface of a first active material line of the first active material lines comprises at least one of a (101) plane or an {hk0} plane, and wherein the first active material line comprises $LiCoO_2$, $Li(Ni_aCO_bMn_{1-a-b})O_2$, wherein $0 \leq a \leq 1$, $0 \leq b \leq 1$, and $a+b=1$, $Li(Ni_xCo_yAl_{1-x-y})O_2$, wherein $0 \leq x \leq 1$, $0 \leq y \leq 1$, and $x+y=1$, $LiMn_2O_4$, or $LiFePO_4$.

19. The active material structure of claim 18, wherein
the first active material lines comprise first surfaces and second surfaces opposite one another,
the second active material lines comprise third surfaces and fourth surfaces opposite one another,
the third surfaces is between the second surfaces and the fourth surfaces,
the second surfaces is between the first surfaces and the third surfaces, and
the first surfaces, second surfaces, the third surfaces, and fourth surfaces comprise a (003) plane,
wherein, when analyzed by X-ray diffraction using CuKα radiation, an intensity of a peak corresponding to a (003) plane, an intensity of a peak corresponding to a (101) plane, and an intensity of a peak corresponding to a {hk0} plane satisfy the relationship $(B+C)/A \geq 2.7$, wherein A represents the intensity of the peak corresponding to the (003) plane, B represents the intensity of the peak corresponding to the (101) plane, and C represents the intensity of the peak corresponding to of the {hk0} plane.

20. A method of fabricating the active material structure of claim 1, the method comprising:
providing an active material film;
forming first channels in the active material film, the first channels arranged in the first direction;
forming second channels in the active material film, the second channels arranged in the second direction; and
sintering the active material film, wherein the first channels comprise recessed regions of the active material film that are recessed to a first depth from a first surface of the active material film,
the second channels comprise recessed regions of the active material film that are recessed to a second depth from a second surface of the active material film, the second surface of the active material film being opposite the first surface of the active material film, and
a sum of the first depth and the second depth is greater than a thickness of the active material film measured in the third direction.

21. The method of claim 20, wherein
the forming of the first channels comprises pressing the first surface of the active material film with a first stamp such that the first stamp is inserted into the active material film, and
the forming of the second channels comprises pressing the second surface of the active material film with a second stamp such that the second stamp is inserted into the active material film.

22. The method of claim 20, wherein
the providing of the active material film comprises:
forming a preliminary second active material layer;
forming a preliminary intermediate active material layer on the preliminary second active material layer; and
forming a preliminary first active material layer on the preliminary intermediate active material layer.

23. The method of claim 22, wherein
the first depth is equal to a sum of a thickness of the preliminary intermediate active material layer measured in the third direction and a thickness of the preliminary first active material layer measured in the third direction, and
the second depth is equal to a sum of the thickness of the preliminary intermediate active material layer and a thickness of the preliminary second active material layer measured in the third direction.

24. The method of claim 22, wherein
the first depth is greater than a sum of a thickness of the preliminary intermediate active material layer measured in the third direction and a thickness of the preliminary first active material layer measured in the third direction, and
the second depth is greater than a sum of the thickness of the preliminary intermediate active material layer and a thickness of the preliminary second active material layer measured in the third direction.

25. The method of claim 20, further comprising:
providing a binder in the active material film before the sintering of the active material film; and
removing the binder from the active material film during the sintering of the active material film.

26. The method of claim 20, further comprising forming third channels in the active material film, the third channels arranged in the third direction intersecting the first direction and the second direction,
wherein the third channels comprise recessed regions of the active material film that are recessed to a third depth from the first surface of the active material film.

27. An active material structure comprising:
a first active material layer on a second active material layer;
an intermediate active material layer between the second active material layer and the first active material layer;
first channels extending in the first active material layer and the intermediate active material layer in a first direction; and second channels extending in the second active material layer and the intermediate active material layer in a second direction intersecting the first direction, wherein the first channels and the second channels intersect each other in the intermediate active material layer, wherein the first active material layer, the second active material layer, the intermediate active material layer, or a combination thereof comprises a cathode active material, wherein a depth of a first channel measured in a third direction is about 50% to about 80% of a thickness of the active material structure measured in the third direction, the third direction intersecting the first direction and the second direction, and wherein a depth of a second channel measured in the third direction is about 50% to about 80% of the thickness of the active material structure.

28. The active material structure of claim 27, wherein the first active material layer comprises a first surface and a second surface opposite one another, the second active material layer comprises a third surface and a fourth surface opposite one another, the third surface is between the second surface and the fourth surface, the second surface is between the first surface and the third surface, the first channels extend from the first surface of the first active material layer to the first surface of the second active material layer, thus exposing the first surface of the second active material layer, and the second channels extend from the second surface of the second active material layer to the second surface of the first active material layer, thus exposing the second surface of the first active material layer.

29. The active material structure of claim 28, wherein the first channels extend into the second active material layer, and active material structure comprises a step between the first surface of the second active material layer exposed via the first channels and a surface of the second active material layer adjacent to the first active material layer.

30. The active material structure of claim 29, wherein the second channels extend into the first active material layer, and active material structure comprises a step between the second surface of the first active material layer exposed via the second channels and a surface of the first active material layer adjacent to the second active material layer.

31. The active material structure of claim 27, further comprising third channels extending in the first active material layer and the intermediate active material layer, the third channels extending in the third direction intersecting the first direction and the second direction, wherein the third channels intersect the first channels and the second channels in the intermediate active material layer, and wherein the first channels and the third channels intersect each other in the first active material layer.

32. An active material structure comprising:
first active material lines arranged in a first direction;
second active material lines arranged in a second direction intersecting the first direction;
intermediate active material lines between the first active material lines and the second active material lines in a third direction intersecting the first direction and the second direction, the intermediate active material lines provided in overlapping regions of the first active material lines and the second active material lines;
first channels between and co-extensive with adjacent first active material lines; and
second channels between and co-extensive with adjacent second active material lines, wherein the first active material lines and the second active material lines are electrically connected by the intermediate active material lines, wherein a depth of a first channel measured in the third direction is about 50% to about 80% of a thickness of the active material structure measured in the third direction, and wherein a depth of a second channel measured in the third direction is about 50% to about 80% of the thickness of the active material structure.

33. An electrode structure comprising:
a current collector layer; and
an active material structure on the current collector layer, wherein the active material structure comprises a first portion and a second portion, the second portion of the active material structure is between the first portion of the active material structure and the current collector layer, the second portion of the active material structure comprises a first surface and a second surface opposite one another, the first surface is between the first portion of the active material structure and the second surface, the current collector layer comprises a third surface and a fourth surface opposite one another, the third surface is between the active material structure and the fourth surface, the active material structure comprises:
first channels extending in a first direction parallel to the first surface of the current collector layer; and
second channels intersecting the first channels and extending in a second direction parallel to the first surface of the current collector layer, the first surface of the current collector layer is exposed via the first channels, the first surface of the second portion of the active material structure is exposed via the second channels, the active material structure comprises a cathode active material, a depth of a first channel measured in a third direction is about 50% to about 80% of a thickness of the active material structure measured in the third direction, the third direction being perpendicular to the first surface of the current collector layer, and a depth of a second channel measured in the third direction is about 50% to about 80% of the thickness of the active material structure.

34. The electrode structure of claim 33, wherein the second portion of the active material structure comprises second active material lines extending in the first direction, wherein the first channels are provided between the second active material lines.

35. The electrode structure of claim 33, wherein the first portion of the active material structure comprises a first surface and a second surface opposite one another, the second surface of the first portion of the active material structure is between the first surface of the first portion of the active material structure and the second portion of the active material structure, the second channels pass through the first portion of the active material structure, and the second surface of the first portion of the active material structure is exposed via the first channels.

36. The electrode structure of claim 35, wherein the first portion of the active material structure comprises first active material lines extending in the second direction, wherein the second channels are provided between the first active material lines.

37. The electrode structure of claim 33, wherein wherein the thickness of the active material structure is in a range of about 50 micrometers to about 1,000 micrometers.

38. The electrode structure of claim 33, wherein a width of a first channel measured in the second direction is in a range of about 0.5 micrometers to about 10 micrometers, a width of a second channel measured in the first direction is in a range of about 0.5 micrometers to about 10 micrometers, a distance between a pair of first channels adjacent to each other is in a range of about 1 micrometers to about 500 micrometers, and a distance between a pair of second channels adjacent to each other is in a range of about 1 micrometers to about 500 micrometers.

39. The electrode structure of claim 33, further comprising third channels intersecting the first channels and the second channels and extending in the third direction parallel to the first surface of the current collector layer, wherein the first surface of the second portion of the active material structure is exposed via the third channels.

40. The electrode structure of claim 33, wherein the first channels and the second channels intersect each other between the second portion of the active material structure and the first portion of the active material structure.

41. A secondary battery comprising:

a first electrode structure on a second electrode structure;

a separator between the second electrode structure and the first electrode structure;

wherein the second electrode structure comprises:

first active material lines arranged in a first direction;

second active material lines arranged in a second direction intersecting the first direction;

intermediate active material lines provided between the first active material lines and the second active material lines in a third direction intersecting the first direction and the second direction, the intermediate active material lines provided in overlapping regions of the first active material lines and the second active material lines, first channels between the first active material lines; and second channels between the second active material lines;

wherein the first active material lines and the second active material lines are electrically connected by the intermediate active material lines, and wherein the first active material lines, the second active material lines, the intermediate active material lines, or a combination thereof comprises a cathode active material, wherein a depth of a first channel measured in the third direction is about 50% to about 80% of a thickness of the active material structure measured in the third direction, and wherein a depth of a second channel measured in the third direction is about 50% to about 80% of the thickness of the active material structure.

42. The second battery of claim 41, wherein the second electrode structure further comprises a current collector layer provided at opposite sides of the intermediate active material lines with the second active material lines therebetween.

43. The second battery of claim 41, wherein the first active material lines comprise first surfaces and second surfaces opposite one another, the second active material lines comprise third surfaces and fourth surfaces opposite one another, the third surfaces is between the second surfaces and the fourth surfaces, the second surfaces is between the first surfaces and the third surfaces, the first channels extend between the intermediate active material lines, thus exposing the third surfaces, the second channels extend between the intermediate active material lines, thus exposing the second surfaces, and the first channels and the second channels intersect each other between the intermediate active material lines.

44. The second battery of claim 43, further comprising an electrolyte in the first channels and the second channels.

* * * * *